United States Patent
Marimuthu et al.

(10) Patent No.: US 12,531,548 B2
(45) Date of Patent: Jan. 20, 2026

(54) SEQUENTIAL CIRCUIT BASED OSCILLATOR

(71) Applicant: QUALCOMM Incorporated, San Diego, CA (US)

(72) Inventors: Saravanan Marimuthu, Bangalore (IN); Yi Lou, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 17 days.

(21) Appl. No.: 18/601,677

(22) Filed: Mar. 11, 2024

(65) Prior Publication Data

US 2025/0286540 A1   Sep. 11, 2025

(51) Int. Cl.
    H03K 3/03   (2006.01)
(52) U.S. Cl.
    CPC ................... H03K 3/0315 (2013.01)
(58) Field of Classification Search
    CPC ............ H03K 3/0315; G01R 31/31725; G01R 31/3016; G01R 31/31727; Y10S 331/03
    See application file for complete search history.

(56) References Cited

U.S. PATENT DOCUMENTS

| | | | |
|---|---|---|---|
| 9,123,446 B1 * | 9/2015 | Ecker | ................... G11C 11/417 |
| 9,197,211 B2 | 11/2015 | Venas | |
| 2005/0248415 A1 | 11/2005 | Osvaldella | |
| 2006/0109058 A1 | 5/2006 | Keating | |
| 2012/0044024 A1 * | 2/2012 | Wagner | ................ H03K 3/0315 331/57 |
| 2015/0226800 A1 * | 8/2015 | Kim | ................ G01R 31/31725 702/79 |

OTHER PUBLICATIONS

Huang B-J., et al., "An Octa-Core 2.8/2GHZ Dual-Gear Sensor-Assisted High-Speed and Power-Efficient CPU in 7nm FinFET 5G Smartphone SoC", ISSCC 2021, Session 35, Adaptive Digital Techniques for Variation Tolerant Systems, Feb. 2021, 3 pages.
International Search Report and Written Opinion—PCT/US2025/013453—ISA/EPO—Jul. 18, 2025.
Partial International Search Report—PCT/US2025/013453—ISA/EPO—May 16, 2025.

* cited by examiner

*Primary Examiner* — Ryan Johnson
(74) *Attorney, Agent, or Firm* — Loza & Loza, LLP

(57) ABSTRACT

An apparatus includes a first edge-triggered storage device that has a first clock input, a first data input, and a first data output. The apparatus also includes a first feedback path from the first data output to the first clock input. The apparatus further includes a second edge-triggered storage device that has a second clock input, a second data input, and a second data output. The second clock input is coupled to the first data output. The apparatus additionally includes a second feedback path from the second data output to the second clock input, as well as a third feedback path from the second data output to the first clock input.

19 Claims, 14 Drawing Sheets

SEQUENTIAL CIRCUIT BASED OSCILLATOR

TECHNICAL FIELD

The technology discussed below relates generally to oscillation circuits and, more particularly, to a ring oscillator implemented using sequential circuits.

INTRODUCTION

Electronic device technologies have seen explosive growth over the past several years. For example, growth in wireless communication technologies and network technologies has been fueled by more advanced hardware and software. Service providers are now able to offer their customers an ever-expanding array of features and services, and provide users with unprecedented levels of access to information, resources, and communication services. To keep pace with these service enhancements, electronic devices (e.g., cellular phones, computers, servers, tablets, laptops, etc.) have higher performance (e.g., higher processing rates, higher transmission rates, higher computational rates, etc.) and complexity than ever.

With this increase in performance and complexity, the power consumption of electronic devices has generally increased. In addition, it is desirable to obtain the maximum performance from an electronics device as efficiently as possible. Therefore, there is an ongoing need for monitoring the silicon processing condition for performance and power-related improvements in electronic devices. Ring oscillators are commonly used as process monitors in state-of-the-art chip designs, which can provide real-time information to control the power supply of high performance low power circuits.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In various aspects of the disclosure, an apparatus includes a first edge-triggered storage device that has a first clock input, a first data input, and a first data output. The apparatus also includes a first feedback path from the first data output to the first clock input. The apparatus further includes a second edge-triggered storage device that has a second clock input, a second data input, and a second data output. The second clock input is coupled to the first data output. The apparatus additionally includes a second feedback path from the second data output to the second clock input, as well as a third feedback path from the second data output to the first clock input.

In various aspects of the disclosure, a ring oscillator includes a first edge-triggered storage device that has a first clock input, a first data input, and a first data output. The ring oscillator also includes a first logic circuit that has a first input, a second input, and a first output. The first input is coupled to the first data output of the first edge-triggered storage device. The second input is coupled to a reset circuit. The first output is coupled to the first data input of the first edge-triggered storage device. The ring oscillator further includes a first multiplexer that has a first multiplexer input, a second multiplexer input, a control input, and a multiplexer output. The first multiplexer input is coupled to the first data output of the first edge-triggered storage device. The control input is coupled to the reset circuit. The ring oscillator additionally includes a second logic circuit that has a third input, a fourth input, and a second output. The third input is coupled to the multiplexer output. The second output is coupled to the first clock input of the first edge-triggered storage device.

These and other aspects of the disclosure will become more fully understood upon a review of the detailed description which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

DETAILED DESCRIPTION

Figure 1:
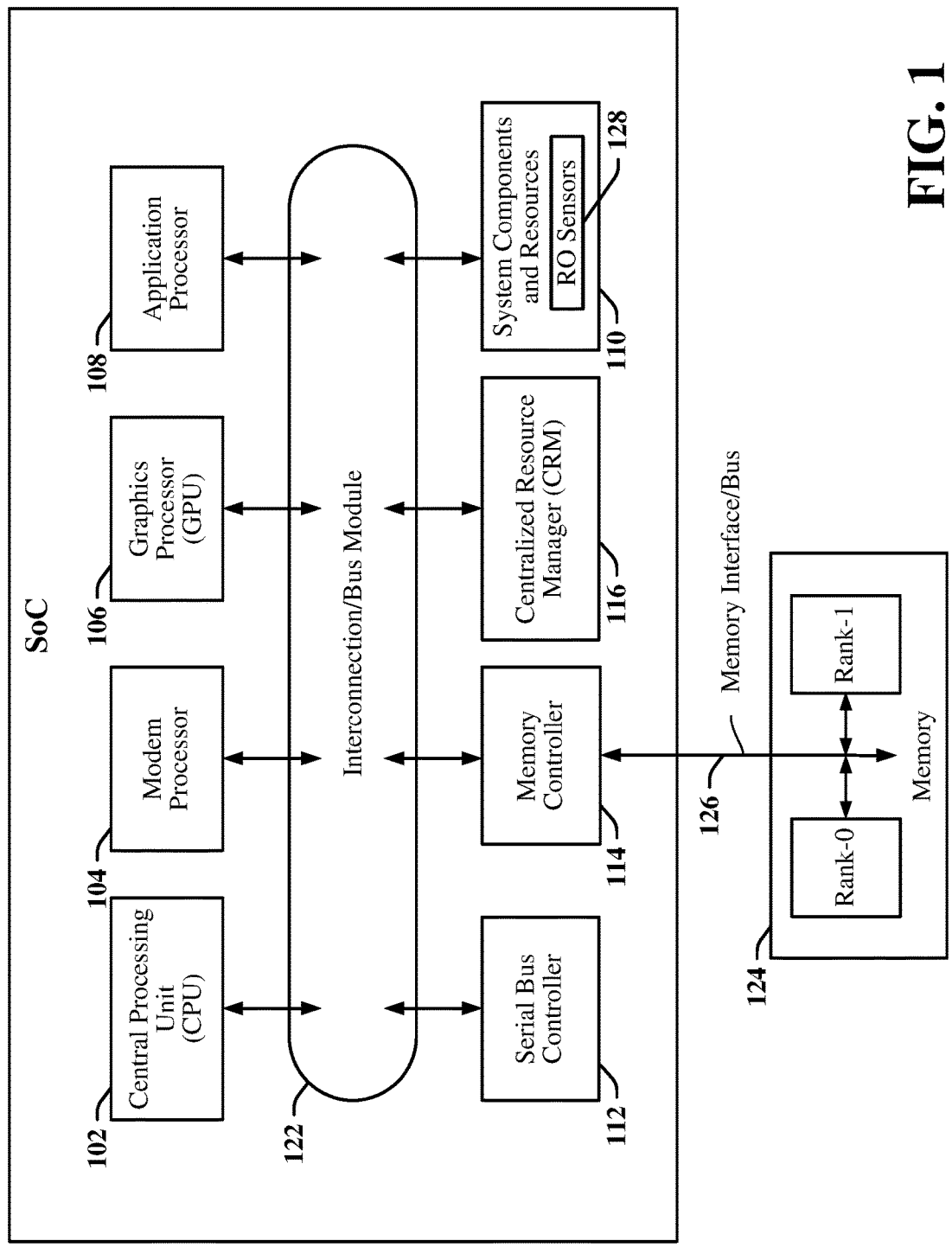
FIG. 1 illustrates an example of a system-on-a-chip (SOC) that may be adapted in accordance with certain aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and/or UE), end-user devices, etc., of varying sizes, shapes, and constitution.

The terms "computing device" and "mobile device" are used interchangeably herein to refer to any one or all of servers, personal computers, smartphones, cellular telephones, tablet computers, laptop computers, notebooks, ultrabooks, palm-top computers, personal data assistants (PDAs), wireless electronic mail receivers, multimedia Internet-enabled cellular telephones, Global Positioning System (GPS) receivers, wireless gaming controllers, and similar personal electronic devices which include a programmable processor. While the various aspects are particularly useful in mobile devices (e.g., smartphones, laptop computers, etc.), which have limited resources (e.g., processing power, battery, size, etc.), the aspects are generally useful in any computing device that may benefit from improved processor performance and reduced energy consumption.

The term "multicore processor" is used herein to refer to a single integrated circuit (IC) chip or chip package that contains two or more independent processing units or cores (e.g., central processing unit (CPU) cores, etc.) configured to read and execute program instructions. The term "multiprocessor" is used herein to refer to a system or device that includes two or more processing units configured to read and execute program instructions.

The term "system on chip" (SoC) is used herein to refer to a single integrated circuit (IC) chip that contains multiple resources and/or processors integrated on a single substrate. A single SoC may contain circuitry for digital, analog, mixed-signal, and radio-frequency functions. A single SoC may also include any number of general purpose and/or specialized processors (digital signal processors (DSPs), modem processors, video processors, etc.), memory blocks (e.g., read only memory (ROM), random access memory (RAM), flash, etc.), and resources (e.g., timers, voltage regulators, oscillators, etc.), any or all of which may be included in one or more cores.

Process technology employed to manufacture semiconductor devices, including IC devices is continually improving. Process technology includes the manufacturing methods used to make IC devices and defines transistor size, operating voltages and switching speeds. Features that are constituent elements of circuits in an IC device may be referred as technology nodes and/or process nodes. The terms technology node, process node, process technology may be used to characterize a specific semiconductor manufacturing process and corresponding design rules. Faster and more power-efficient technology nodes are being continuously developed through the use of smaller feature size to produce smaller transistors that enable the manufacture of higher-density ICs.

ICs typically provide multiple voltage domains for power saving purposes. For example, higher voltage domains provide power at higher voltage levels than lower voltage domains. Higher voltage domains are sometimes needed for interfacing with external devices, while core logic circuits can generally operate at the lower voltage levels available in lower voltage domains. For the purposes of this disclosure, a thick-oxide transistor may refer to a transistor that has a gate oxide thickness sufficient to enable the transistor to withstand and operate at the higher voltage levels in higher voltage domains and a thin-oxide transistor may refer to a transistor that has a gate oxide thickness that is insufficient to avoid electrical overstress when the transistor spans a higher voltage level in the higher voltage domains. In certain examples disclosed herein, a thin-oxide transistor may be rated for voltages up to 0.6 volts and a thick-oxide transistor may be rated for voltages greater than 0.6 volts and thick-oxide transistors may be used in a higher a high-voltage domain that provides power at 1.2 volts.

Certain circuits are illustrated in this disclosure as being implemented using combinations of P-type metal-oxide-semiconductor (PMOS) transistors and N-type metal-oxide-semiconductor (NMOS) transistors. These circuits are provided by way of example only, and it is contemplated that the concepts disclosed herein can be implemented in circuits that use different combinations of NMOS and PMOS transistors. Circuits that include NMOS and PMOS transistors are typically coupled to the rails of a power supply. The power supply provides a current that flows from a higher voltage rail to a lower voltage rail. A rail may include some combination of conductors, wires, connectors and other types of interconnect. For the purposes of this description, the higher voltage rail may be referenced as "VDD" or "VDD" and the lower voltage rail may be referred to as Ground. In some implementations, power may be provided to certain circuits through more than two rails.

For purposes of illustration, FIG. 1 illustrates examples of components and interconnections in a system-on-chip (SoC) 100, including a memory interface/bus 126, that may be suitable for implementing certain aspects of the present disclosure. The SoC 100 may include a number of heterogeneous processors, such as a central processing unit (CPU) 102, a modem processor 104, a graphics processor 106, and an application processor 108. Each processor 102, 104, 106, 108, may include one or more cores, and each processor/core may perform operations independent of the other processors/cores. The processors 102, 104, 106, 108 may be organized in close proximity to one another (e.g., on a single substrate, die, integrated chip, etc.) so that the processors may operate at a much higher frequency/clock rate than would be possible if the signals were to travel off-chip. The proximity of the cores may also allow for the sharing of on-chip memory and resources (e.g., voltage rails), as well as for more coordinated cooperation between cores.

The SoC 100 may include interface circuits that support inter-processor communication and/or communication between one or more of the processors 102, 104, 106, 108, memory, wireless modems, and other peripherals. Many of these interface circuits are based on serializer/deserializer (SerDes) circuits that enable transmission and reception of data over a communication link. SerDes circuits may be used to support high-speed and low-speed communication.

The SoC 100 may include system components and resources 110 for managing sensor data, analog-to-digital conversions, and/or wireless data transmissions, and for performing other specialized operations (e.g., decoding high-definition video, video processing, etc.). System components and resources 110 may also include components such as voltage regulators, voltage controllers, sensors, oscillators, phase-locked loops (PLLs), peripheral bridges, data controllers, system controllers, access ports, timers, registers, and/or other similar components used to support the processors and software clients running on the computing device. The system components and resources 110 may also include circuitry for interfacing with peripheral devices, such as cameras, electronic displays, wireless communication devices, external memory chips, etc.

The SoC 100 may further include a Universal Serial Bus (USB) or other serial bus controller 112, one or more memory controllers 114, and a centralized resource manager (CRM) 116. The SoC 100 may also include an input/output module (not illustrated) for communicating with resources external to the SoC, each of which may be shared by two or more of the internal SoC components.

The processors 102, 104, 106, 108 may be interconnected to the USB controller 112, the memory controller 114, system components and resources 110, CRM 116, and/or other system components via an interconnection/bus module 122, which may include an array of reconfigurable logic gates and/or implement a bus architecture. Communications may also be provided by advanced interconnects, such as high-performance networks on chip.

The interconnection/bus module 122 may include or provide a bus mastering system configured to grant SoC components (e.g., processors, peripherals, etc.) exclusive control of the bus (e.g., to transfer data in burst mode, block transfer mode, etc.) for a set duration, number of operations, number of bytes, etc. In some cases, the interconnection/bus module 122 may implement an arbitration scheme to prevent multiple master components from attempting to drive the bus simultaneously.

The memory controller 114 may be a specialized hardware module configured to manage the flow of data to and from a memory 124 via the memory interface/bus 126. In some examples, the memory controller 114 includes one or more processors configured to perform read and write operations with the memory 124. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

Memory technologies described herein may be suitable for storing instructions, programs, control signals, and/or data for use in or by a computer or other digital electronic device. Any references to terminology and/or technical details related to an individual type of memory, interface, standard, or memory technology are for illustrative purposes only, and not intended to limit the scope of the claims to a particular memory system or technology unless specifically recited in the claim language. Mobile computing device architectures have grown in complexity, and now commonly include multiple processor cores, SoCs, co-processors, functional modules including dedicated processors (e.g., communication modem chips, GPS receivers, etc.), complex memory systems, intricate electrical interconnections (e.g., buses and/or fabrics), and numerous other resources that execute complex and power intensive software applications (e.g., video streaming applications, etc.).

In general, it is desirable that an electronic device (e.g., the SoC 100 of FIG. 1 or some other type of electronic device) provide the highest possible performance while keeping power consumption as low as possible. For example, excessive power consumption may lead to shorter battery life and/or heat-related issues (e.g., which can adversely affect performance and/or cost).

In some examples, an electronic device may be capable of adjusting a power supply voltage level depending on operating conditions and/or other factors. As one example, an electronic device may transmit lower frequency signals at higher voltage levels than higher frequency signals. To support such power optimization, an electronic device may include circuitry to scale the power supply voltage (e.g., $V_{DD}$) provided to various circuits in the electronic device.

As another example, process variations within an integrated circuit die may cause some circuits within the integrated circuit to operate with different delays at a given power supply voltage. In this case, it may be desirable to scale the power supply voltage according to the delay characteristics of the different circuits.

The SoC 100 may include ring oscillator (RO) sensors 128 that provide feedback for VDD scaling. These and other aspects of VDD scaling will be discussed with reference to FIG. 2.

Figure 2:
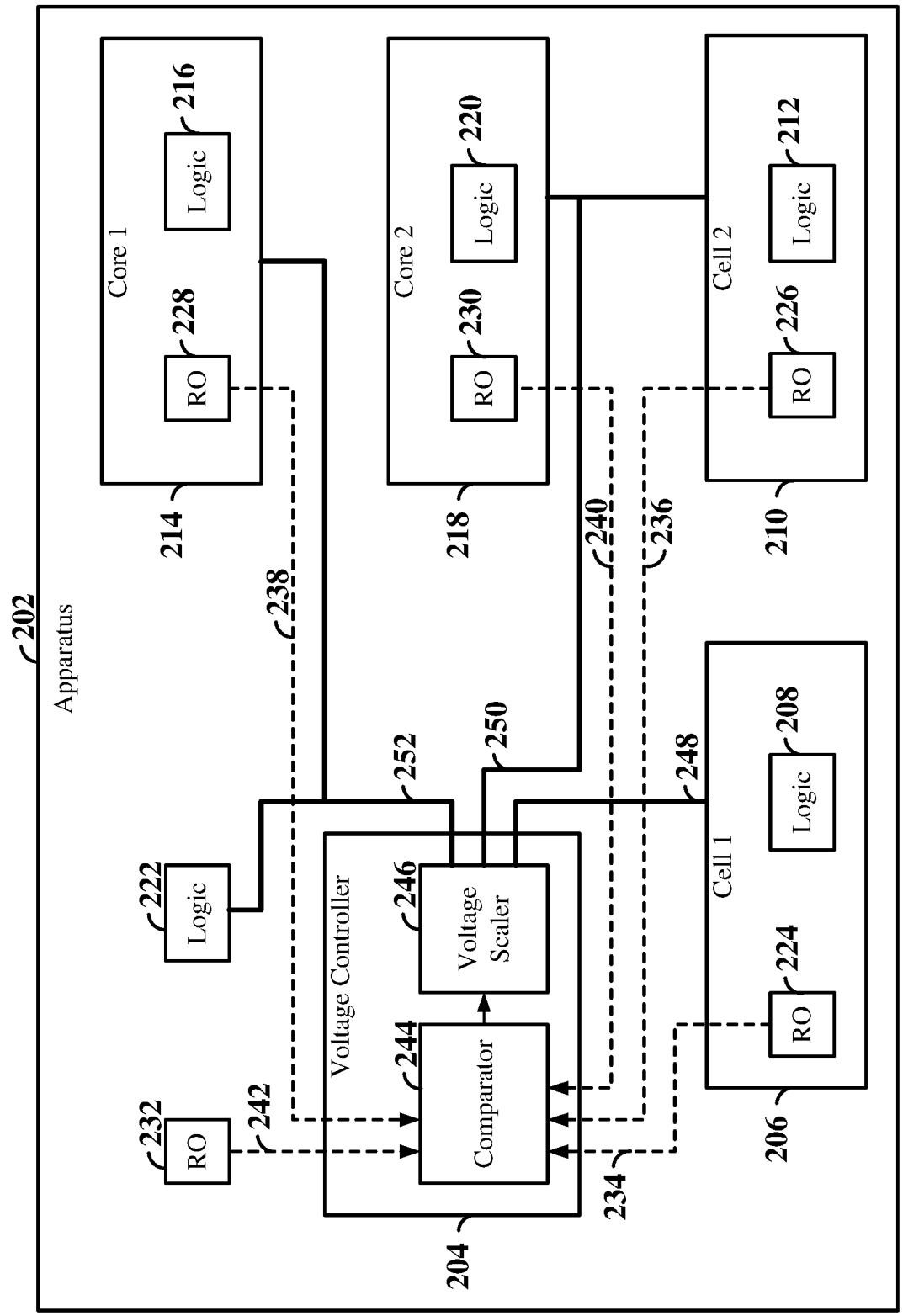
FIG. 2 illustrates an example of an apparatus that includes a voltage controller for scaling power supply voltages in accordance with certain aspects of the disclosure.

FIG. 2 illustrates an example of an apparatus 202 that includes a voltage controller 204 configured to scale power supply voltages provided to different circuits within apparatus 202. The apparatus 202 may be an integrated circuit (IC) in some examples or a device that includes at least one IC in other examples. Examples of such a device include a computer, a server, a user equipment, a base station, a mobile device, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an Internet of Things (IoT). A mobile apparatus may be, for example, an automotive or other transportation vehicle, a remote sensor or actuator, a robot or robotics device, a satellite radio, a global positioning system (GPS) device, an object tracking device, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may be a digital home or smart home device such as a home audio, video, and/or multimedia device, an appliance, a vending machine, intelligent lighting, a home security system, a smart meter, etc. A mobile apparatus may be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, the communicated information of which may be given preferential treatment or prioritized access over other types of information, e.g., in terms of prioritized access for transport of critical service data, and/or relevant quality of service (QOS) for transport of critical service data. A base station may be, for example, a network element in a radio access network responsible for radio transmission and reception in one or more service sets. In different technologies, standards, or contexts, an access point may variously be referred to by those skilled in the art as a base station, a base transceiver station (BTS), a radio base station, a radio transceiver, a transceiver function, a basic service set (BSS), an extended service set (ESS), a Node B (NB), an eNode B (eNB), a gNode B (gNB), a transmission and reception point (TRP), or some other suitable terminology.

Different sections of the apparatus 202 include different logic circuits (logic). For example, a first cell 206 of an IC may include first logic 208 and a second cell 210 of the IC may include second logic 212. As another example, a first core 214 of the apparatus 202 may include third logic 216 and a second core 218 of the apparatus 202 may include fourth logic 220. Thus, in general, the apparatus 202 may include various logic (e.g., fifth logic 222) at various locations within the apparatus 202.

In some examples, the voltage controller 204 scales power supply voltages based on IC process variations at different sections of the apparatus 202 (e.g., process variations across an IC die). The voltage controller 204 may scale power supply voltages based on other factors in other examples.

IC process variations may result in different operating characteristics for circuits in different section of the IC die. For example, circuits in one section may have different delay characteristics than circuits in another section when the circuits are powered by the same power supply voltage.

The apparatus 202 may include sensor circuits such as ring oscillators to determine (e.g., estimate) relative process variations. For example, ring oscillators implemented at different sections of the apparatus 202 subject to process variations may oscillate at different frequencies (e.g., due to different delay characteristics of the components of the ring oscillators in the different sections).

In the example, of FIG. 2, the apparatus 202 includes a first ring oscillator (RO) 224, a second RO 226, a third RO 228, a fourth RO 230, and a fifth RO 232. A different number of ROs may be used in other examples.

Each of the ROs in FIG. 2 is implemented near logic subject to power supply voltage scaling. The first RO 224 is implemented near the first logic 208, the second RO 226 is implemented near the second logic 212, the third RO 228 is implemented near the third logic 216, the fourth RO 230 is implemented near the fourth logic 220, and the fifth RO 232 is implemented near the fifth logic 222.

A given RO may be expected to have similar process characteristics as the corresponding nearby logic. Thus, any difference in process variations between the first logic 208 and the second logic 212 may be comparable to (e.g., the same as or almost the same as) difference in process variations between the first RO 224 and the second RO 226.

As discussed above, a difference between the frequency of the first RO 224 and the frequency of the second RO 226 may be indicative of a difference in process variations between the first RO 224 and the frequency of the second RO 226. Consequently, this difference in frequency may be indicative of a difference in process variations between the first logic 208 and the second logic 212.

The voltage controller 204 may therefore use feedback of this frequency information to scale the power supply voltages for the first logic 208, the second logic 212, the third logic 216, the fourth logic 220, and the fifth logic 222. As shown in FIG. 2, the voltage controller 204 receives a first signal 234 from the first RO 224, a second signal 236 from the second RO 226, a third signal 238 from the third RO 228, a fourth signal 240 from the fourth RO 230, and a fifth signal 242 from the fifth RO 232. A comparator 244 (or some other circuitry) generates a signal or signals corresponding to the difference or differences between two or more of the received signals. For example, the comparator 244 may include a phase-locked loop (PLL) or delay-locked loop (DLL) circuit that generates an error signal indicative of a difference between a nominal frequency and the frequency of a received signal.

In the example of FIG. 2, a voltage scaler 246 scales one or more power supply voltages based on the signal or signal from the comparator 244. For example, the voltage scaler 246 may apply a different scaling factor to a first VDD rail 248 for the first cell 206 than it applies to a second VDD rail 250 for the second cell 210 and the second core 218. Here, the difference between the scaling factors may be based on differences between the frequencies of the first signal 234, the second signal 236, and the fourth signal 240. As another example, the voltage scaler 246 may apply a different scaling factor to a third VDD rail 252 for the first core 214 and the fifth logic 222 than it applies to the second VDD rail 250. Here, the difference between the scaling factors may be based on differences between the frequencies of the third signal 238, the fourth signal 240, and the fifth signal 242. Other techniques for scaling power supply voltages may be used in other examples.

Conventionally, ROs used for power supply voltage scaling above are implemented using combinational logic. For example, ROs may be constructed from logic devices such as inverters, buffer, NAND gates, and NOR gates. Thus, these ROs may effectively characterize the effects of process variations on such circuits.

However, many circuits include both combinational logic and sequential logic (e.g., flip flops, registers, etc.). For example, 40% of a CPU or a graphics processing unit (GPU) may be sequential logic in some cases.

The disclosure relates in some aspects to an RO that incorporates sequential logic. For example, an apparatus may use a sequential RO circuit topology to represent a sequential cell for VDD scaling feedback. Such an RO may be referred to herein as a sequential RO, for convenience. A feedback scheme that uses a sequential ROs may better characterize the effects of process variations within the apparatus, as compared to feedback schemes that use ROs that only employ combinatorial logic, since the sequential ROs may better reflect the process variations associated the sequential logic in the apparatus. In addition, the use of such sequential ROs may be used to correlate a design model with the actual IC generated based on the design model.

Figure 3:
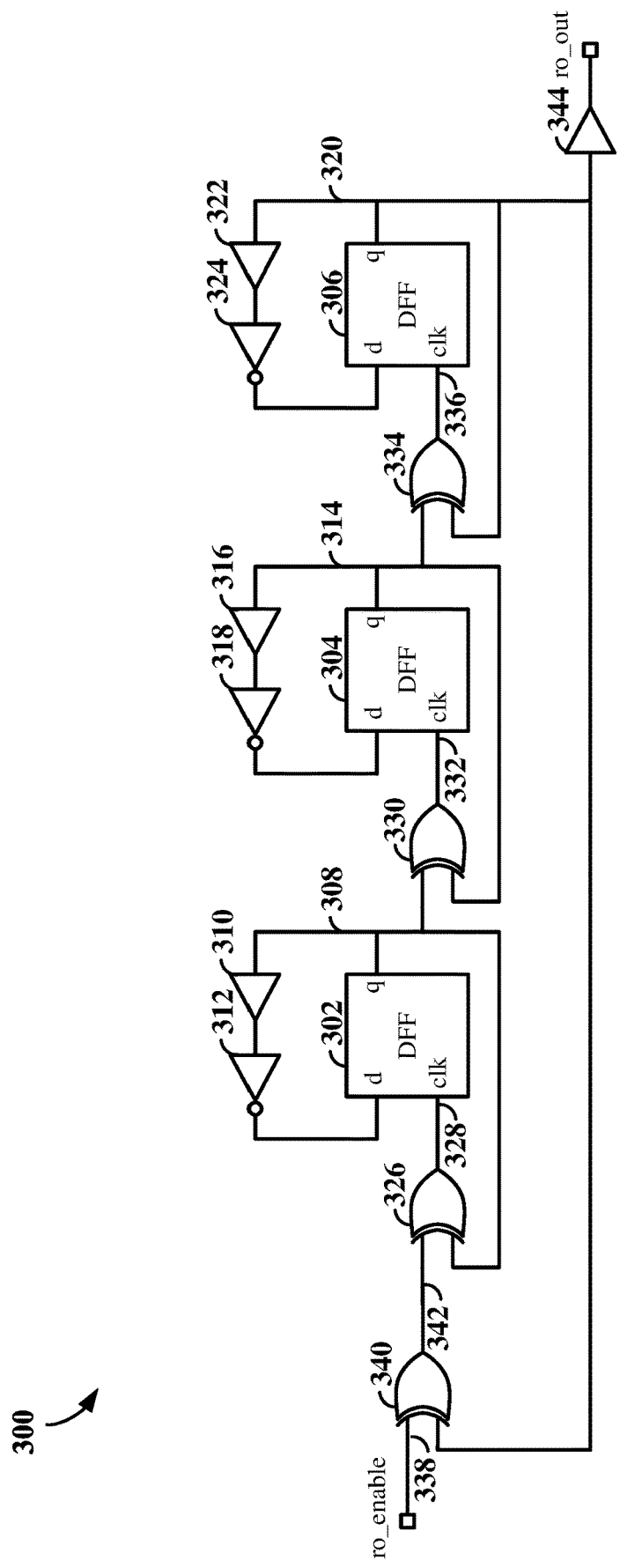
FIG. 3 illustrates an example of a ring oscillator (RO) that includes sequential circuitry such as edge-triggered memory devices in accordance with certain aspects of the disclosure.

Referring to FIG. 3, the disclosure relates in some aspects to an RO 300 that includes sequential circuitry such as edge-triggered memory devices. As used herein, an edge-triggered memory device refers to a memory device that is activated (e.g., latches the value at an input) in response to a rising edge or a falling edge at a clock input of the memory device. For example, for a rising-edge edge-triggered memory device, if a value of 1 is present at the data input of the memory device, the memory device will latch that value when the signal at the clock input of the memory device transitions from a low state to a high state (i.e., a rising edge of a clock signal). Examples of edge-triggered memory devices include flip flops (FFs), registers, and so on.

In the example of FIG. 3, the edge-triggered memory devices are so-called D FFs. D FFs have a data input D (or d), a data output Q (or q), and a clock input CLK (or clk). The D FFs of FIG. 3 could be replace with other types of edge-triggered memory devices in other examples.

For purposes of illustration, the RO 300 is shown as including three stages. The first stage includes a first flip flop (FF) 302 (e.g., a D flip flop (DFF)), the second stage includes a second FF 304, and the third stage includes a third FF 306. A different number of stages may be used in other examples. As one example, an RO may include 20 or more stages in some implementations.

An overview of the operation of a given stage of the RO 300 follows. Oscillation of the RO 300 is controlled by an enable signal (ro_enable). The ro_enable signal transitioning to a high state (e.g., a logic "1") triggers the clock input of the first stage of the RO 300, thereby causing the first stage to propagate its D input (initially a high state) to its Q output. This transition in the Q output of the first stage to a high state causes the following action. First, this transition triggers a rising clock (0→1) for the next stage whereby the next stage propagate its D input (initially a high state) to its Q output. In addition, the transition of the Q output of the first stage to a high state causes the clock for the first stage to be reset back to zero (1→0) to set up the opposite data (master latch) required for the next phase of oscillation. Also, the transition of the Q output of the first stage to a high state causes the opposite value (low state) to be presented to the D input of the first stage as required for the next phase of oscillation. These actions are propagated through each stage of the RO 300. When the corresponding signal propagates to the final stage of the RO 300, this signal is fed back to the first stage of the RO 300 to trigger another clock rising edge (0→1) for first stage, thereby starting the next phase of oscillation.

From the above, it may be observed that the RO 300 is a self-timed RO. For example, after a clock rising edge triggers a flip flop, the clock signal is automatically reset back to a low state (e.g., a logic "0") to be ready for the next clock rising edge. This is accomplished using the output of a downstream node in the RO 300 that provides feedback to reset the clock back to the low state.

The components and operation of the RO 300 will now be discussed in more detail.

At each stage of the RO 300, an inverter (and, optionally, a buffer) feeds back the Q output of the FF for that stage to the D input of the FF. This causes the Q output of the FF to oscillate between the high state and the low state with each incoming clock pulse at the clock input of the FF. Thus, at the first FF 302, the Q output at a signal path 308 is fed back to the D input via a first buffer 310 and a first inverter 312. Similarly, at the second FF 304, the Q output at a signal path 314 is fed back to the D input via a second buffer 316 and a second inverter 318. Also, at the third FF 306, the Q output at a signal path 320 is fed back to the D input via a third buffer 322 and a third inverter 324.

Also at each stage of the RO, an exclusive OR (XOR) gate feeds back the Q output of the FF to the CLK input of the FF. As discussed in more detail below, this automatically resets the CLK output back to a low state. This feature enables the FF to be repeatedly clocked by a succession of rising edges at the CLK input whereby, after each rising edge, the CLK input is automatically reset back to the low state. At the first FF 302, the Q output at the signal path 308 is fed back through a first XOR 326 to the CLK input via a signal path 328. Similarly, at the second FF 304, the Q output at the signal path 314 is fed back through a second XOR 330 to the CLK input via a signal path 332. Also, at the third FF 306, the Q output at the signal path 320 is fed back through a third XOR 334 to the CLK input via a signal path 336.

An ro_enable signal enables oscillation of the RO 300. Initially, it is assumed that the ro_enable signal and the Q outputs of the first FF 302, the second FF 304, and the third FF 306 are at the low state (e.g., a discussed in more detail below). Thus, the D inputs of the first FF 302, the second FF 304, and the third FF 306 are at the high state. In this case, the output of a fourth XOR 340 on a signal path 342 will also be at the low state since both inputs of the fourth XOR 340 are at the low state at this point. Similarly, the output (the signal path 328) of the first XOR 326 will be at the low state since both inputs of the first XOR 326 are at the low state.

A transition of the ro_enable signal to the high state, causes the output of the fourth XOR 340 on the signal path 342 to transition to the high state. This, in turn, causes the output of the first XOR 326 on the signal path 328 to transition to the high state. The resulting rising edge at the CLK input of the first FF 302 causes the first FF 302 to latch the value at its D input (high state) to its Q output. Thus, the signal path 308 transitions to the high state. This causes the output of the first inverter 312 (D input of the first FF 302) to transition to the low state.

The transition of the signal path 308 to the high state causes the output of the second XOR 330 on the signal path 332 to transition to the high state. The resulting rising edge at the CLK input of the second FF 304 causes the second FF 304 to latch the value at its D input (high state) to its Q output. Thus, the signal path 314 transitions to the high state. This causes the output of the second inverter 318 (D input of the second FF 304) to transition to the low state.

The transition of the signal path 314 to the high state causes the output of the third XOR 334 on the signal path 336 to transition to the high state. The resulting rising edge at the CLK input of the third FF 306 causes the third FF 306 to latch the value at its D input (high state) to its Q output. Thus, the signal path 320 transitions to the high state. This causes the output of the third inverter 324 (D input of the third FF 306) to transition to the low state.

The signal path 320 is fed back to the fourth XOR 340. The transition of the signal path 320 to the high state causes the output of the fourth XOR 340 on the signal path 342 to transition to the low state (both inputs to the fourth XOR 340 are now at the high state). The transition of the signal path 342 to the low state causes the output of the first XOR 326 on the signal path 328 to transition to the high state since the signal path 308 is now at the high state.

The resulting rising edge at the CLK input of the first FF 302 causes the first FF 302 to latch the value at its D input (low state) to its Q output. Thus, the signal path 308 transitions to back to the low state. This causes the output of the first inverter 312 (D input of the first FF 302) to transition back to the high state.

Thus, it may be seen that the outputs of the FFs will repeatedly transition between the low state and the high state. Consequently, the resulting oscillating signal of the RO 300 can be output via a buffer 344 as an ro_out signal.

The delay characteristics of ROs such as the RO 300 across an IC die may vary according to process variations across the IC die. An example of such a delay characteristic is the clock-to-Q time of an edge-triggered memory device. This delay time may be referred to herein as the clock-to-Q arc. Thus, the clock-to-Q arc may be shorter for some ROs than for other ROs on an IC die due to process variations.

The operating frequency of the RO 300 is based on the CLK-to-Q rise and fall arcs and the delays of the XORs. Since these parameters may be affected by process variations, the operating frequency of the RO 300 may be affected by process variations. Consequently, different ROs on an IC die may have different operating frequencies due to process variations. Thus, the RO 300 may be used as a sensor for power supply voltage scaling (e.g., as discussed above in conjunction with FIG. 2).

The FFs of the RO 300 do not need to include internal reset functionality to reset the FFs back to a given state for each oscillation cycle. Consequently, since the FF design of the RO 300 may be simpler than FFs that include internal reset functionality, the FF may take up less area on the IC die. This frees up additional IC die area that may be used, for example, to provide additional functionality that might not otherwise be provided on the IC die.

Also, in contrast with a FF design that incorporates internal reset functionality, the frequency of the RO 300 is based on clock-to-Q arcs for both low to high transitions of the Q outputs and high to low transitions of the Q outputs. Thus, the RO 300 may be used to obtain a more robust (e.g., more accurate) characterization of the FF delay characteristics based on both clock-to-Q arcs as compared to other RO designs. For example, an RO design that uses FFs with internal reset functionality may characterize the FF delay only with respect to one of the clock-to-Q arcs (e.g., for the low to high transitions of the Q outputs).

In some examples, an RO may include initialization circuitry to set all of the FFs of the RO to a known state. An example of such circuitry is shown in the example RO 400 of FIG. 4.

The RO 400 is depicted as including three stages similar to the RO 300. Again, a different number of stages may be employed in different implementations.

The RO 400 includes the same basic design as the RO 300 of FIG. 3, except that the logic circuits of the RO 400 are represented as logic elements as would be implemented, for example, on an IC die. A first FF 402, a second FF 404, and a third FF 406 of FIG. 4 correspond to the first FF 302, the second FF 304, and the third FF 306 of FIG. 3, respectively. Similarly, a first XOR 426, a second XOR 430, a third XOR 434, and a fourth XOR 440 of FIG. 4 correspond to the first XOR 326, the second XOR 330, the third XOR 334, and the fourth XOR 340 of FIG. 3, respectively. A first negative OR (NOR) 412, a second NOR 418, and a third NOR 424 provide an inversion function during operation similar to the functionality of the first inverter 312, the second inverter 318, and the third inverter 324 of FIG. 3, respectively. A signal path 408, a signal path 414, a signal path 420, a signal path 428, a signal path 432, a signal path 436, and a signal path 442 correspond to the signal path 308, the signal path 314, the signal path 320, the signal path 328, the signal path 332, the signal path 336, and the signal path 342 of FIG. 3, respectively. A buffer 444 corresponds to the buffer 344 of FIG. 3.

Initialization circuitry including a pulse generator circuit 450, a reset circuit 452, a first multiplexer 454, a second multiplexer 456, and a third multiplexer 458 serve to reset the RO 400 to a known state prior to oscillation of the RO 400 being enabled. Specifically, when invoked, the initialization circuitry resets each of the inputs and the outputs of the first FF 402, the second FF 404, and the third FF 406 to a low state. This initialization circuitry is not in the frequency-determining RO oscillation signal path. Thus, the initialization circuitry does not impact the operating frequency of the RO 400.

The pulse generator circuit 450 generates an initial pulse (initial_pulse) signal that is output by a buffer 460 on a signal path 462. The initial_pulse signal is fed to a "b" input of each of the first multiplexer 454, the second multiplexer 456, and the third multiplexer 458. The pulse generator circuit 450 may generate the initial_pulse signal in different ways in different examples. In some examples, the pulse generator circuit 450 includes circuitry to selectively enable a clock signal onto the signal path 462. This clock signal may be generated by the pulse generator circuit 450 or some other circuit (e.g., a clock generator of an SoC). In some examples, the pulse generator circuit 450 may include circuitry to toggle a register, an I/O pin, or some other circuit to generate the initial_pulse signal. In some examples, at least some of the functionality of the pulse generator circuit 450 may be implemented in a processor (e.g., one of the processors of FIG. 1).

The reset circuit 452 generates a reset signal that is output by a buffer 464 on a signal path 466. The reset signal is fed to the control input of each of the first multiplexer 454, the second multiplexer 456, and the third multiplexer 458, and to a respective input of each of the first NOR 412, the second NOR 418, and the third NOR 424. The reset circuit 452 may generate the reset signal in different ways in different examples. In some examples, the reset circuit 452 may include circuitry to toggle a register, an I/O pin, or some other circuit to generate the reset signal. In some examples, at least some of the functionality of the reset circuit 452 may be implemented in a processor (e.g., one of the processors of FIG. 1).

An enable circuit 468 generates an ro_enable signal that is output on a signal path 470 to an input of the fourth XOR 440. The enable circuit 468 may generate the ro_enable signal in different ways in different examples. In some examples, the enable circuit 468 may include circuitry to toggle a register, and I/O pin, or some other circuit to generate the ro_enable signal. In some examples, at least some of the functionality of the enable circuit 468 may be implemented in a processor (e.g., one of the processors of FIG. 1).

An example of an initialization operation follows. Other initialization operations may be used in other examples.

Figure 4:
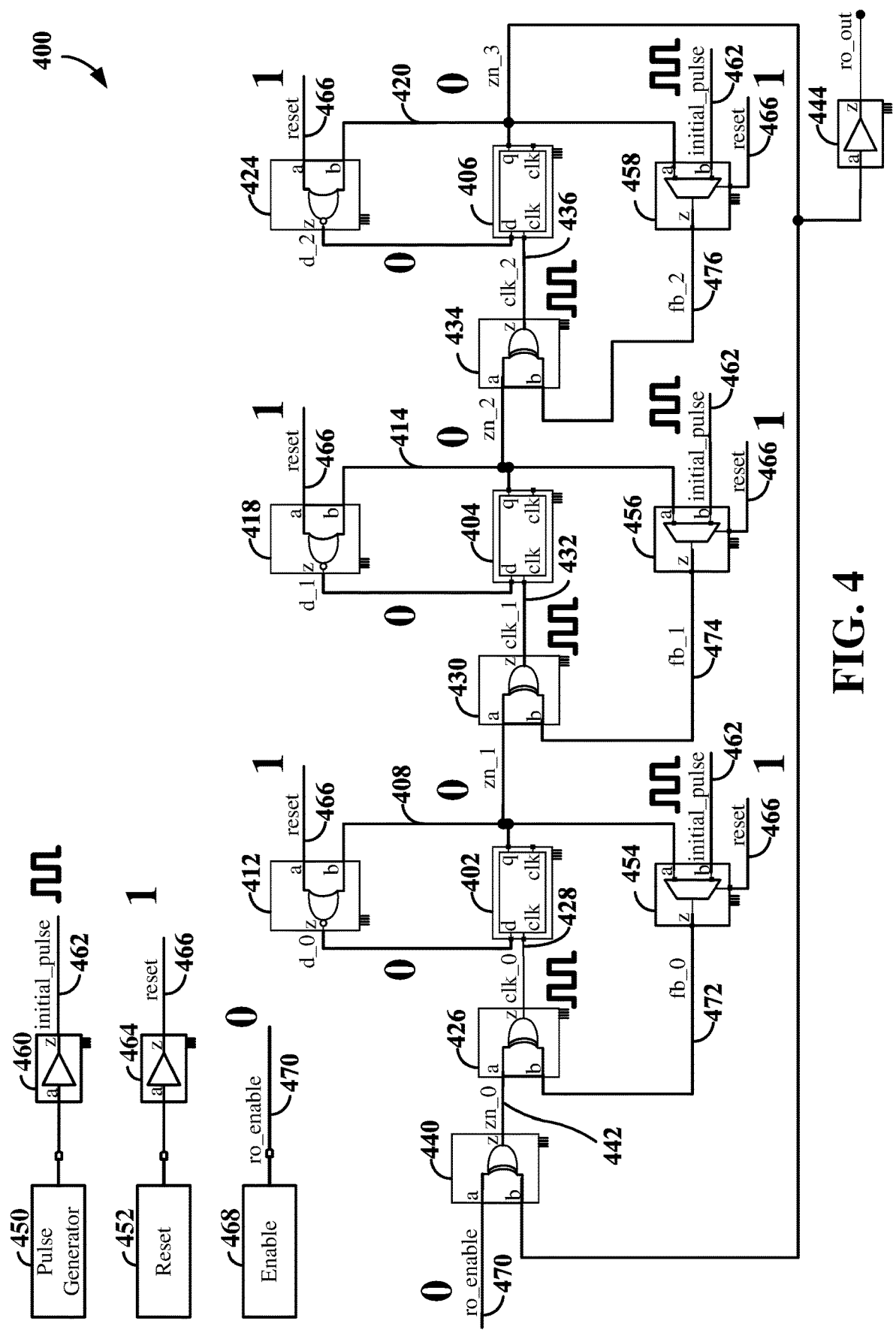
FIG. 4 illustrates another example of a RO in accordance with certain aspects of the disclosure.

The enable circuit 468 sets the ro_enable signal to a low state whenever the oscillation of the RO 400 is being disabled. This is represented in FIG. 4 by the logic value "0" (e.g., a voltage level at or near ground) next to the signal path 470.

To commence the initialization operation, the reset circuit 452 sets the reset signal to the high state. This is represented in FIG. 4 by the large logic value "1" (e.g., a voltage level at or near $V_{DD}$) next to the signal path 466.

When the reset signal is at the high state, the value at the data input of each of the FFs will be at the low state. Specifically, the signals d_0, d_1, and d_2 output by the first NOR 412, the second NOR 418, and the third NOR 424, respectively, will each be at the low state as represented by the corresponding logic values of "0" in FIG. 4.

In addition, the reset signal at the high state means that the multiplexer control inputs will be at the high state. Thus, each of the multiplexers will select its "b" input as its output. Thus, the signal fb_0 output by the first multiplexer 454 on a signal path 472 will correspond to the initial_pulse signal. The signal fb_1 output by the second multiplexer 456 on a signal path 474 will correspond to the initial_pulse signal. The signal fb_2 output by the third multiplexer 458 on a signal path 476 will correspond to the initial_pulse signal.

In conjunction with the reset signal being at the high state, the pulse generator circuit 450 activates the initial_pulse signal. In some examples the initial_pulse signal consists of several pulses. The initial_pulse signal is represented in FIG. 4 by the short rectangular wave next to the signal path 462.

Each of the first XOR 426, the second XOR 430, and the third XOR 434 passes the initial_pulse signal from its respective multiplexer (signals fb_0, fb_1, and fb_2) to its respective output. Thus, each of the clock signals clk_0, clk_1, and clk_2 will include a rising edge that causes each of the first FF 402, the second FF 404, and the third FF 406 to propagate its D input to its Q output. Consequently, each of the output signals zn_1, zn_2, and zn_3 will be at the low state as indicated.

At the end of the initialization operation, the reset circuit 452 sets the reset signal to the low state. At this point, the RO 400 is initialized to a desired state (all FF outputs at the low state and all FF inputs at the high state).

Figure 5:
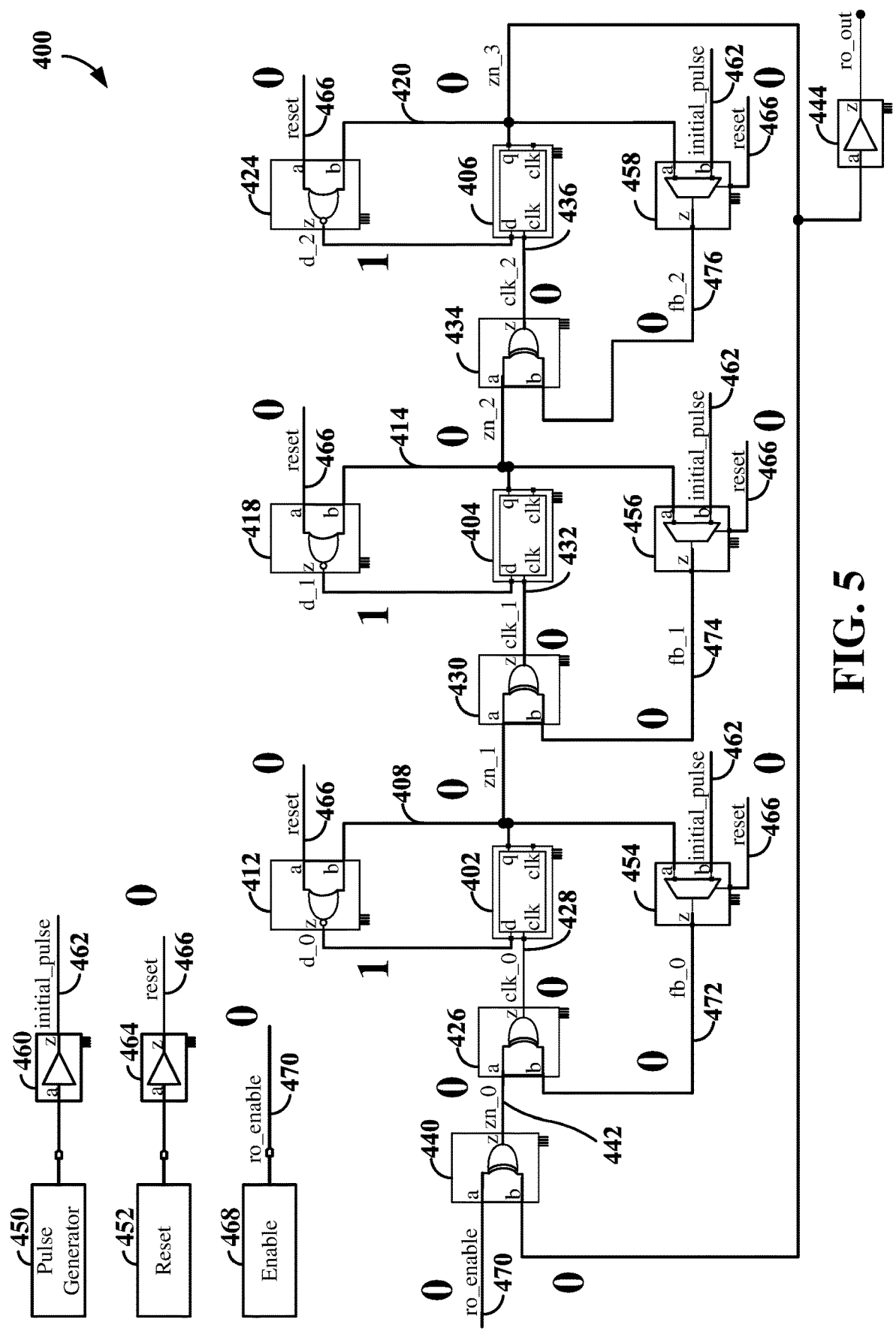
FIG. 5 illustrates an example of an initial state of the RO of FIG. 4.

FIG. 5 illustrates an example of an initial state of the RO 400 of FIG. 4 at the end of the initialization operation. As mentioned above, since the reset signal is now at the low state, the first NOR 412, the second NOR 418, and the third NOR 424 function as inverters. Thus, the signals d_0, d_1, and d_2 are set to the high state.

In addition, the reset signal at the low state means that the multiplexer control inputs will be at the low state. Thus, each of the multiplexers will select its "a" input as its output. Consequently, the signal fb_0 output by the first multiplexer 454 on a signal path 472 will correspond to the output signal zn_1. The signal fb_1 output by the second multiplexer 456 on a signal path 474 will correspond to the output signal zn_2. The signal fb_2 output by the third multiplexer 458 on a signal path 476 will correspond to the output signal zn_3.

As shown in FIG. 5, all of the inputs to the XORs are at the low state. Thus, each of the clock signals clk_0, clk_1, and clk_2 is at the low state.

With the above in mind, several operational states of the RO 400 will now be described with reference to FIGS. 6-13. These figures illustrate, in sequence, state transitions that follow the initialization operation.

Figure 6:
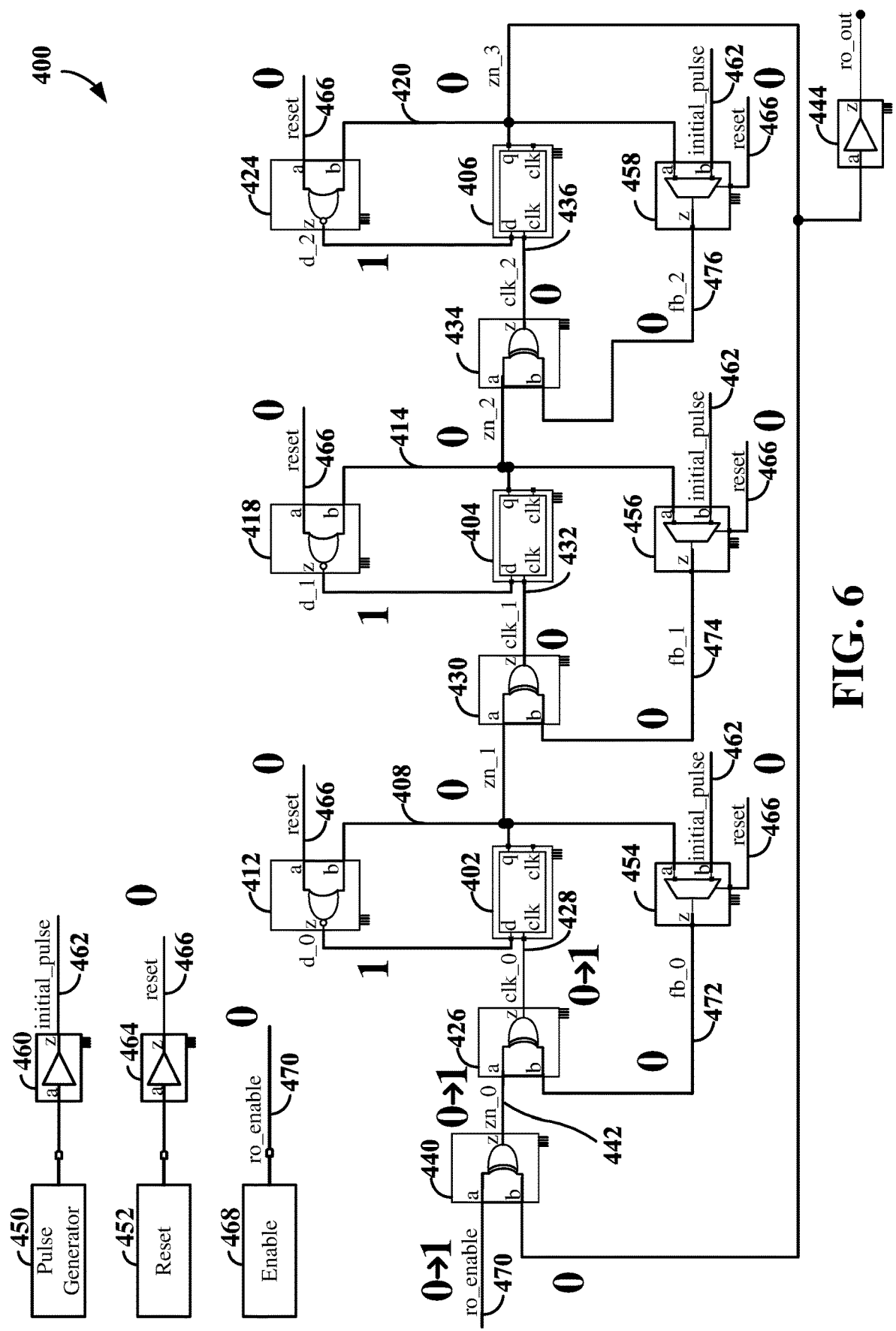
FIG. 6 illustrates an example of a first operational state of the RO of FIG. 4.

FIG. 6 illustrates an example of a first operational state of the RO 400 of FIG. 4 that involves enabling the RO 400. Initially, the enable circuit 468 sets the enable signal to a high state. This results in a rising edge propagating to the clock signal clk_0.

Figure 7:
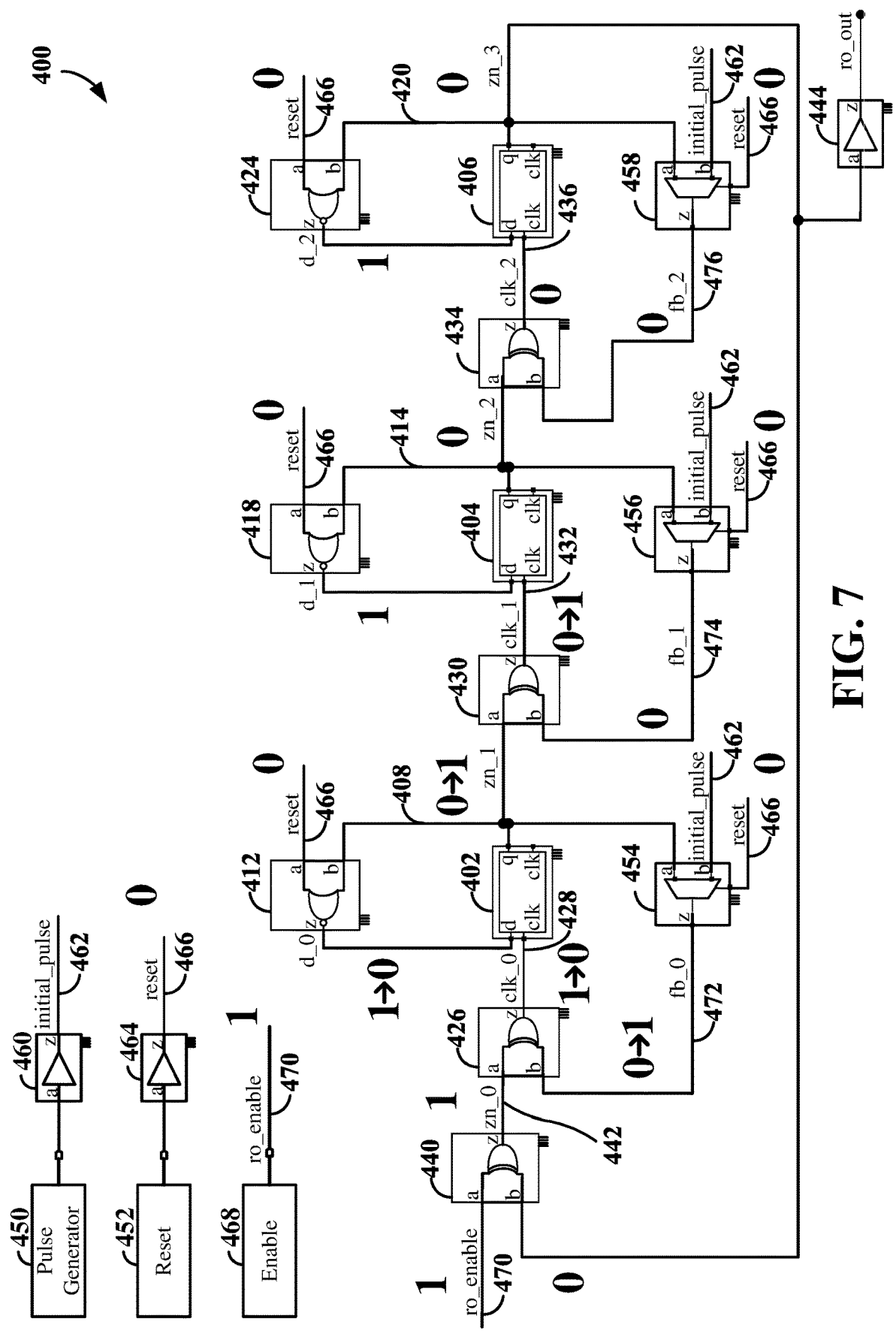
FIG. 7 illustrates an example of a second operational state of the RO of FIG. 4.

FIG. 7 illustrates an example of a second operational state of the RO 400 of FIG. 4 following the first operational state of FIG. 6. The rising edge the clock signal clk_0 (as shown in FIG. 6) caused the first FF 402 to capture the value at its D input (d_0=high state in FIG. 6) and propagate that value to its Q output. Thus, the output signal zn_1 transitions to a high state. This results in a rising edge propagating to the clock signal clk_1.

When the output signal zn_1 transitions to the high state, the signal fb_0 transitions to the high state as well. This causes the clock signal clk_0 to transition to the low state. In addition, the input signal d_0 transitions to the low state.

Thus, by feeding back the output signal zn_1 to the D and CLK inputs of the first FF 402, both of these inputs are reset to the low state. Consequently, the first FF 402 will be ready to receive another clock pulse as discussed below that will cause the first FF 402 to toggle its output again.

Figure 8:
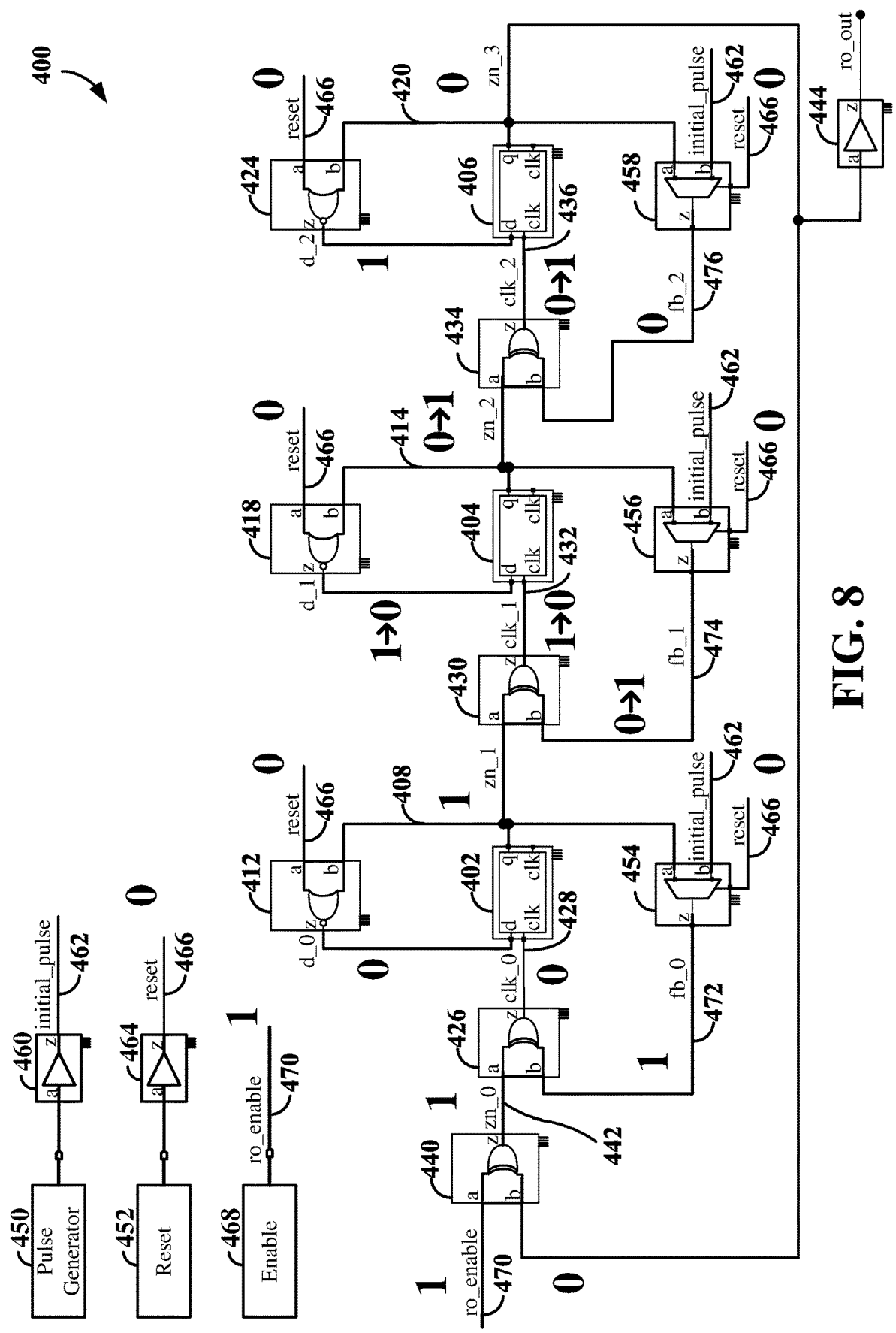
FIG. 8 illustrates an example of a third operational state of the RO of FIG. 4.

FIG. 8 illustrates an example of a third operational state of the RO 400 of FIG. 4 following the second operational state of FIG. 7. The rising edge the clock signal clk_1 (as shown in FIG. 7) caused the second FF 404 to capture the value at its D input (d_1=high state in FIG. 7) and propagate that value to its Q output. Thus, the output signal zn_2 transitions to a high state. This results in a rising edge propagating to the clock signal clk_2.

When the output signal zn_2 transitions to the high state, the signal fb_1 transitions to the high state as well. This causes the clock signal clk_1 to transition to the low state. In addition, the input signal d_1 transitions to the low state.

Thus, by feeding back the output signal zn_2 to the D and CLK inputs of the second FF 404, both of these inputs are reset to the low state. Consequently, the second FF 404 will be ready to receive another clock pulse.

Figure 9:
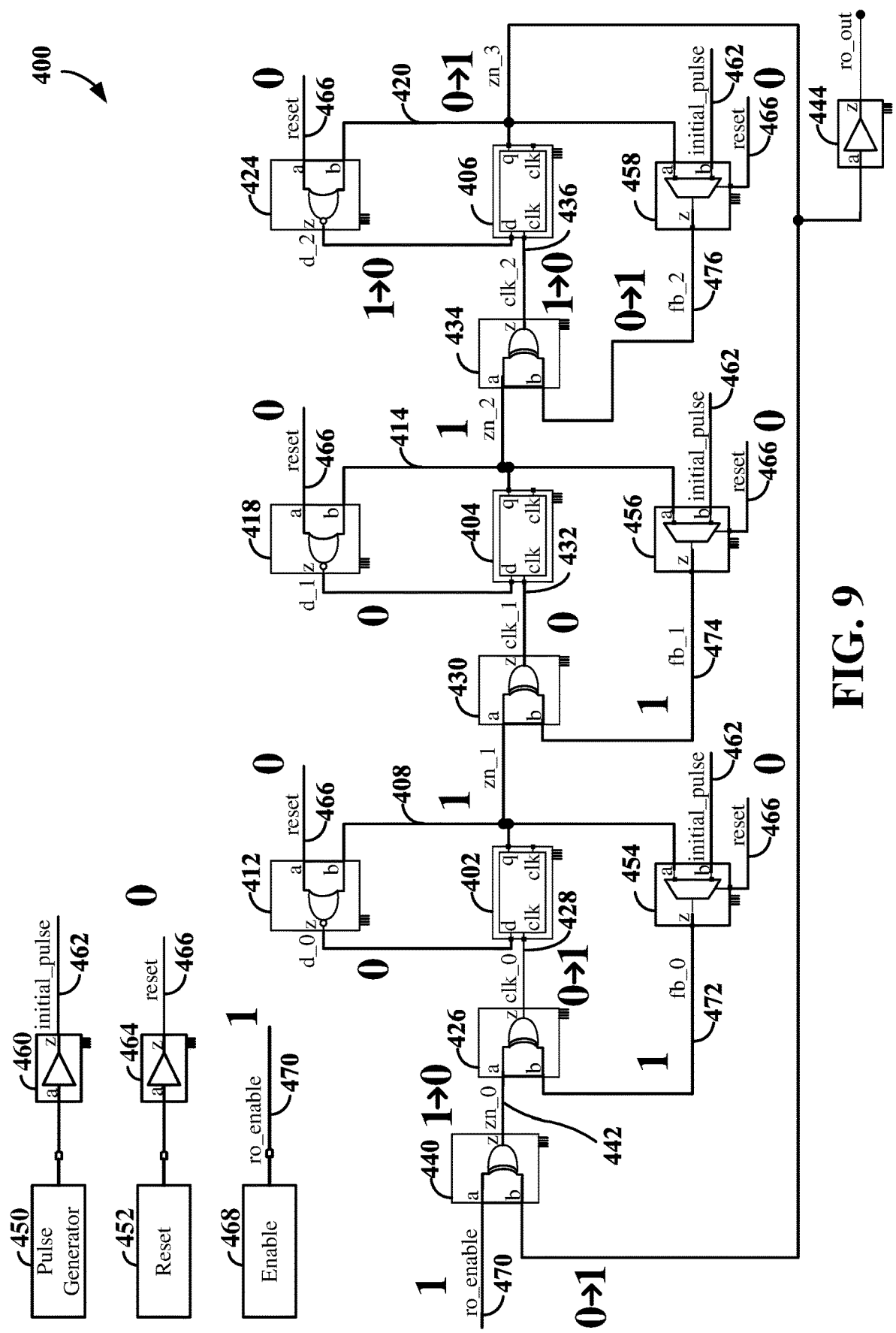
FIG. 9 illustrates an example of a fourth operational state of the RO of FIG. 4.

FIG. 9 illustrates an example of a fourth operational state of the RO 400 of FIG. 4 following the third operational state of FIG. 8. The rising edge the clock signal clk_2 (as shown in FIG. 8) caused the third FF 406 to capture the value at its D input (d_2=high state in FIG. 8) and propagate that value to its Q output. Thus, the output signal zn_3 transitions to a high state.

When the output signal zn_3 transitions to the high state, the signal fb_2 transitions to the high state as well. This causes the clock signal clk_2 to transition to the low state. In addition, the input signal d_2 transitions to the low state.

Thus, by feeding back the output signal zn_3 to the D and CLK inputs of the third FF 406, both of these inputs are reset to the low state. Consequently, the third FF 406 will be ready to receive another clock pulse.

As discussed herein, the output of the final stage of the RO 400 is fed back to the first stage to enable oscillation of the RO 400. As shown in FIG. 9, when the output signal zn_3 transitions to the high state, the signal zn_0 transitions to the low state. This results in a rising edge propagating to the clock signal clk_0.

Figure 10:
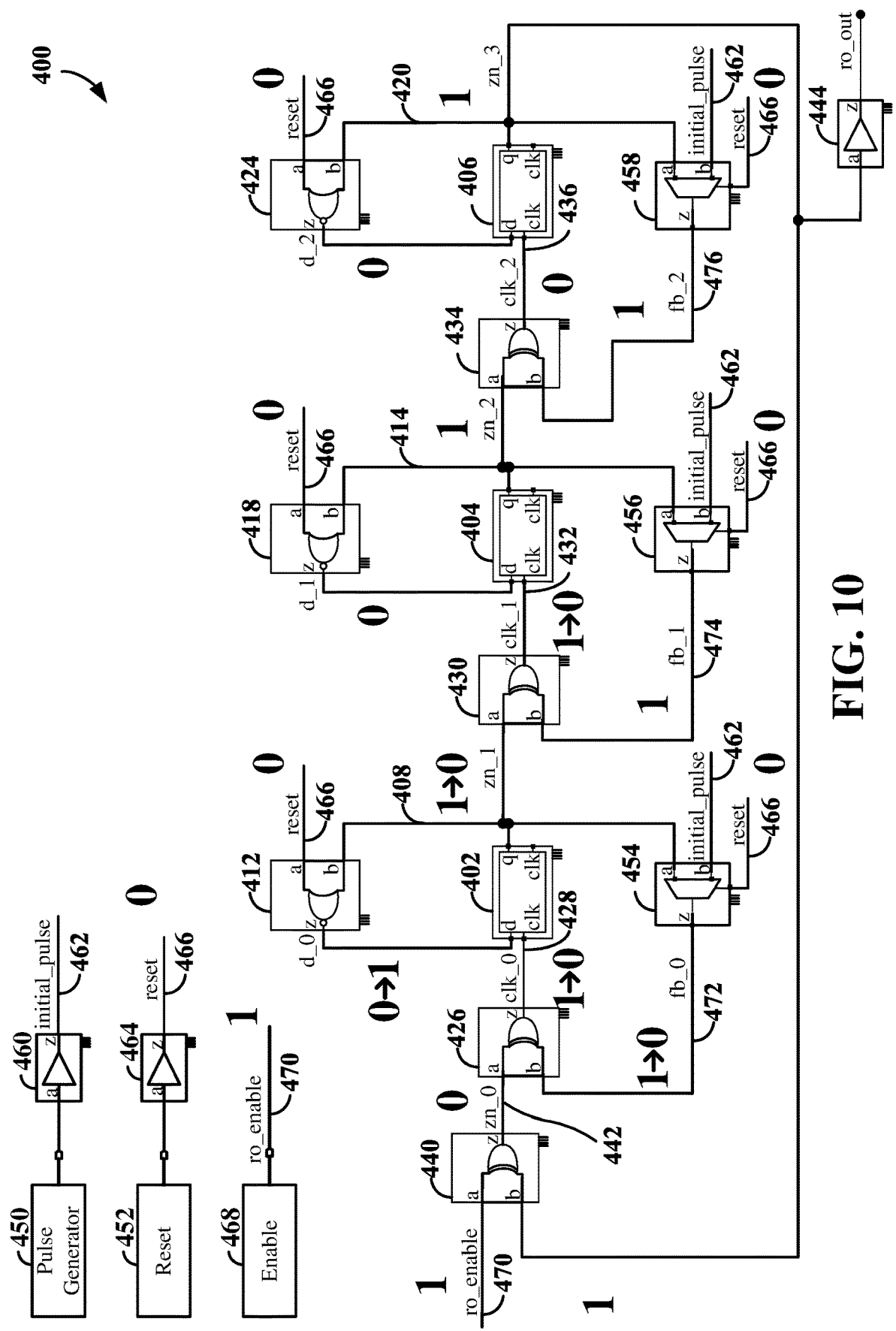
FIG. 10 illustrates an example of a fifth operational state of the RO of FIG. 4.

FIG. 10 illustrates an example of a fifth operational state of the RO 400 of FIG. 4 following the fourth operational state of FIG. 9. The rising edge the clock signal clk_0 (as shown in FIG. 9) caused the first FF 402 to capture the value at its D input (d_0=low state in FIG. 9) and propagate that value to its Q output. Thus, the output signal zn_1 transitions to a low state. This results in a rising edge at the clock signal clk_1.

When the output signal zn_1 transitions to the low state, the signal fb_0 transitions to the low state as well. This causes the clock signal clk_0 to transition to the low state. In addition, the input signal d_0 transitions to the high state.

By feeding back the output signal zn_1 to the CLK input of the first FF 402, the clock signal clk_0 is reset to the low state. In addition, by feeding back the output signal zn_1 to the D input of the first FF 402, the signal d_0 is set to the high state. Consequently, the first FF 402 will be ready to receive another clock pulse that will cause the first FF 402 to again toggle its output.

The low state will be propagated to the second FF 404 and the third FF 406 in a similar manner as discussed above. Then, when the low state propagates back to the fourth XOR 440, the high state will again be propagated through the first FF 02, the second FF 404, and the third FF 406 as discussed above in conjunction with FIGS. 6-10. As such, the RO 400 will continue to oscillate until the RO 400 is disabled.

Figure 11:
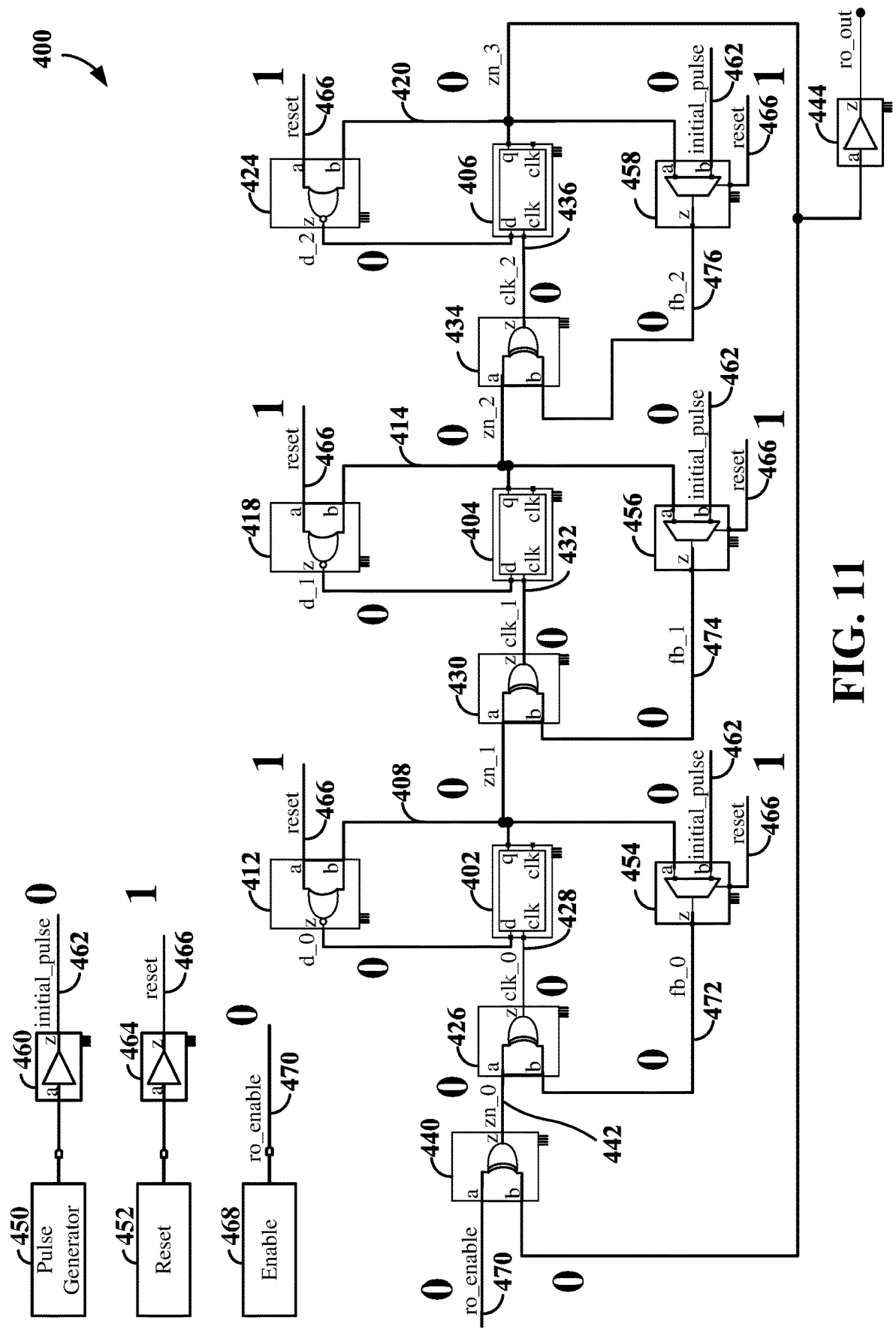
FIG. 11 illustrates an example of a sixth operational state of the RO of FIG. 4.

FIG. 11 illustrates an example of disabling the RO 400 of FIG. 4. The enable circuit 468 sets the ro_enable signal to a low state. The reset circuit sets the reset signal to a high state. The pulse generator circuit 450 sets the initial_pulse signal to a low state. Thus, all of the D inputs of the FFs are set to the low state and pulses cannot propagate through the stages. Consequently, the RO 400 ceases oscillation.

The RO 400 may be implemented in different ways in different examples. For example, in an alternative implementation, the reset function could set the input and the output of every FF to a high state. In this case, each of the NORs could be replaced with a corresponding negative AND (NAND) to provide the Q-to-D inversion function. The reset circuit 452 could drive the reset signal on the signal path 466 to a low state to perform the reset function in this case (to force the FFs inputs to the high state). Also, the inputs to the multiplexers may be switched so that each multiplexer outputs the initial_pulse signal on the signal path 462 when the reset signal is at the low state. Alternatively, inverters may be employed at the NAND reset inputs whereby the reset circuit 452 would control the reset signal as discussed in FIG. 4 (high state corresponds to reset being activated).

Figure 12:
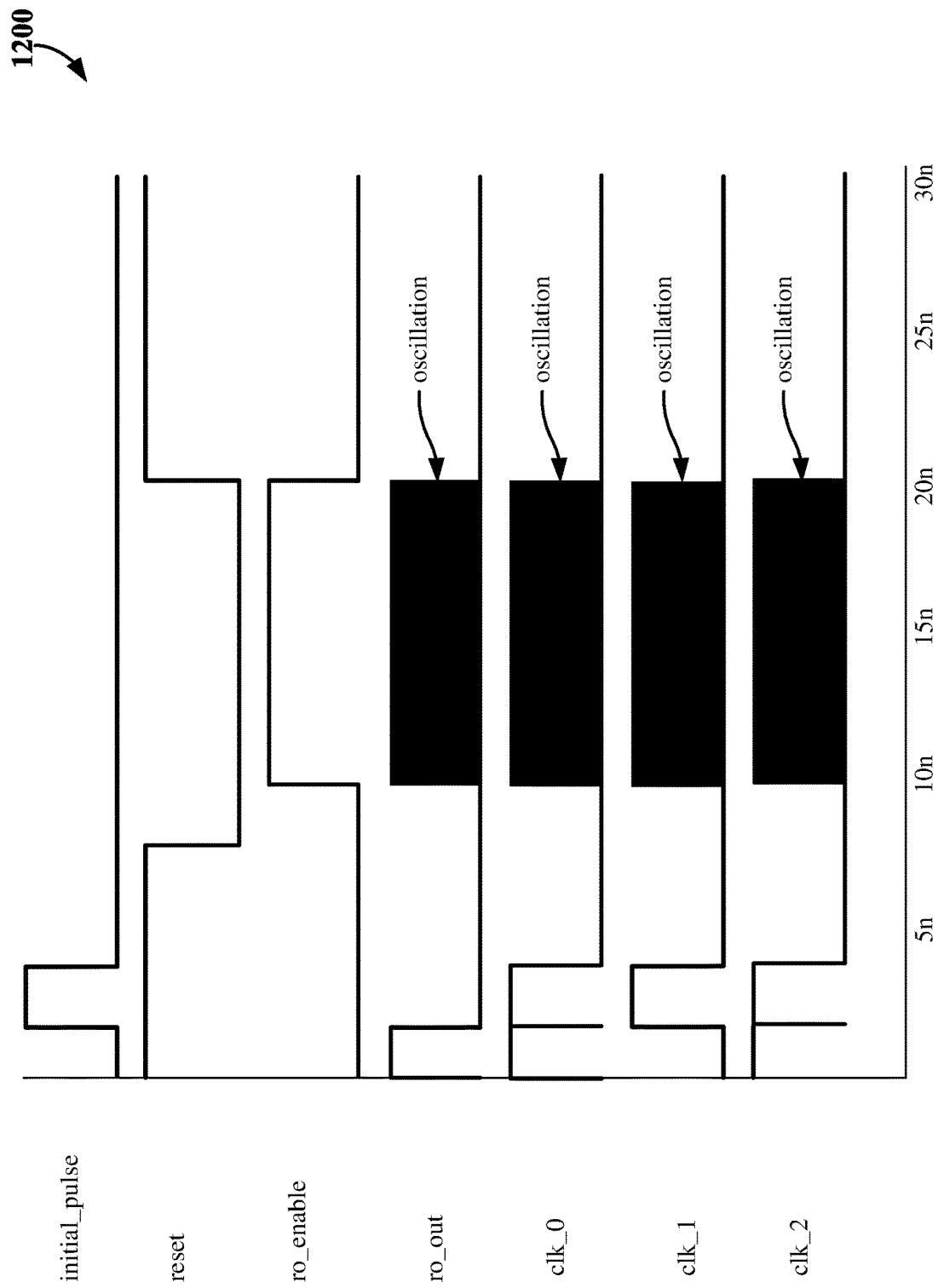
FIG. 12 illustrates an example timing diagram for the RO of FIG. 4.

FIG. 12 illustrates an example timing diagram 1200 for the RO 400 of FIG. 4. Initially, the initial_pulse signal is at a low state, the reset signal is at a high state, and the ro_enable signal is at a low state. Subsequently, the initial_pulse signal is set to the high state, then to the low state which causes the RO 400 to be set to an initialized state. For example, as shown in FIG. 12, the ro_out signal as well as the clock signals clk_0, clk_1, and clk_2 are set to the low state. The reset signal is then set to the low state and the ro_enable signal is set to the high state, enabling oscillation of the RO 400. That is, the ro_out signal and the clock signals clk_0, clk_1, and clk_2 repeatedly transition between the low state and the high state based on the inherent oscillation frequency of the RO 400 (e.g., based the FF clock-to-Q arcs and the XOR delays). The RO 400 continues to oscillate until the ro_enable signal is set to the low state.

Figure 13:
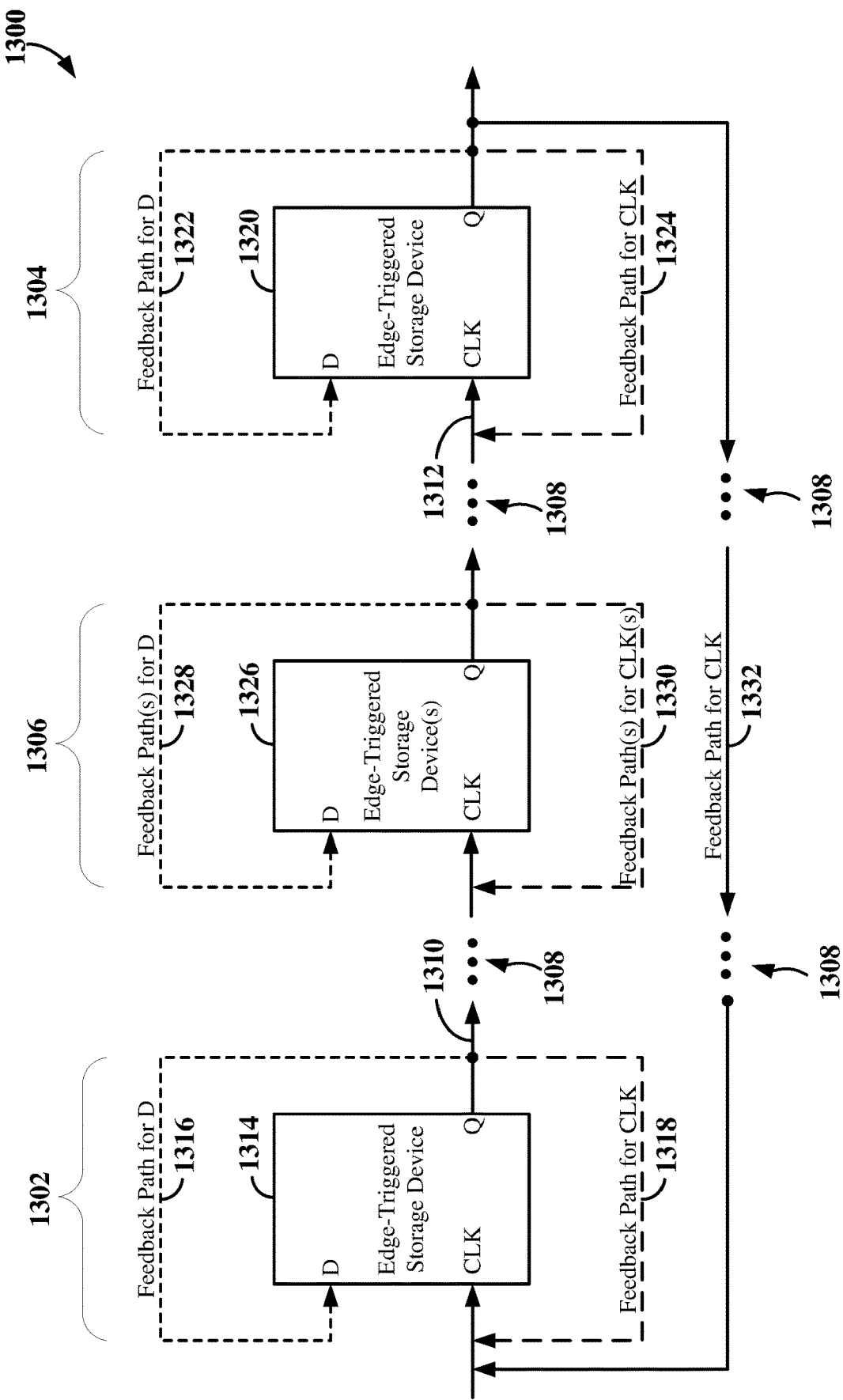
FIG. 13 illustrates multi-stage RO in accordance with certain aspects of the disclosure.

FIG. 13 illustrates a multi-stage RO 1300 in accordance with certain aspects of the disclosure. The multi-stage RO 1300 includes a first stage 1302, a final stage 1304, and any number of intervening stages 1306. The intervening stages 1306 are coupled to the first stage 1302 and the final stage 1304 as represented by the ellipses 1308.

As used herein, the term "coupled" or "coupling" can refer to a direct coupling or an indirect coupling. An example of an indirect coupling is "coupled via one or more circuits." For example, the Q output 1310 of the first stage 1302 is coupled to the CLK input 1312 of the final stage 1304. In this case, the coupling is indirect in that the coupling is via one or more circuits of each stage of the intervening stages 1306.

Each stage of the multi-stage RO 1300 includes an edge-triggered storage device, an internal feedback path for data (D), and an internal feedback path for clock (CLK). For example, the first stage 1302 includes a first edge-triggered memory device 1314 (e.g., a FF, a register, etc.), a first feedback path for data 1316 including an inversion circuit (not shown), and a first feedback path for clock 1318 (e.g., including a multiplexer and other logic, not shown). Similarly, the final stage 1304 includes a second edge-triggered memory device 1320 (e.g., a FF, a register, etc.), a second feedback path for data 1322 including an inversion circuit (not shown), and a second feedback path for clock 1324 (e.g., including a multiplexer and other logic, not shown). Also, each stage of the intervening stages 1306 includes a third edge-triggered memory device 1326 (e.g., a FF, a register, etc.), a third feedback path for data 1328 including an inversion circuit (not shown), and a third feedback path for clock 1330 (e.g., including a multiplexer and other logic, not shown).

The multi-stage RO 1300 also includes a feedback path for clock 1332 that couples the Q output of the final stage 1304 to the CLK input of the first stage 1302. As discussed herein, this coupling may be an indirect coupling in that the coupling may be via one or more logic circuits (e.g., XOR gates).

Figure 14:
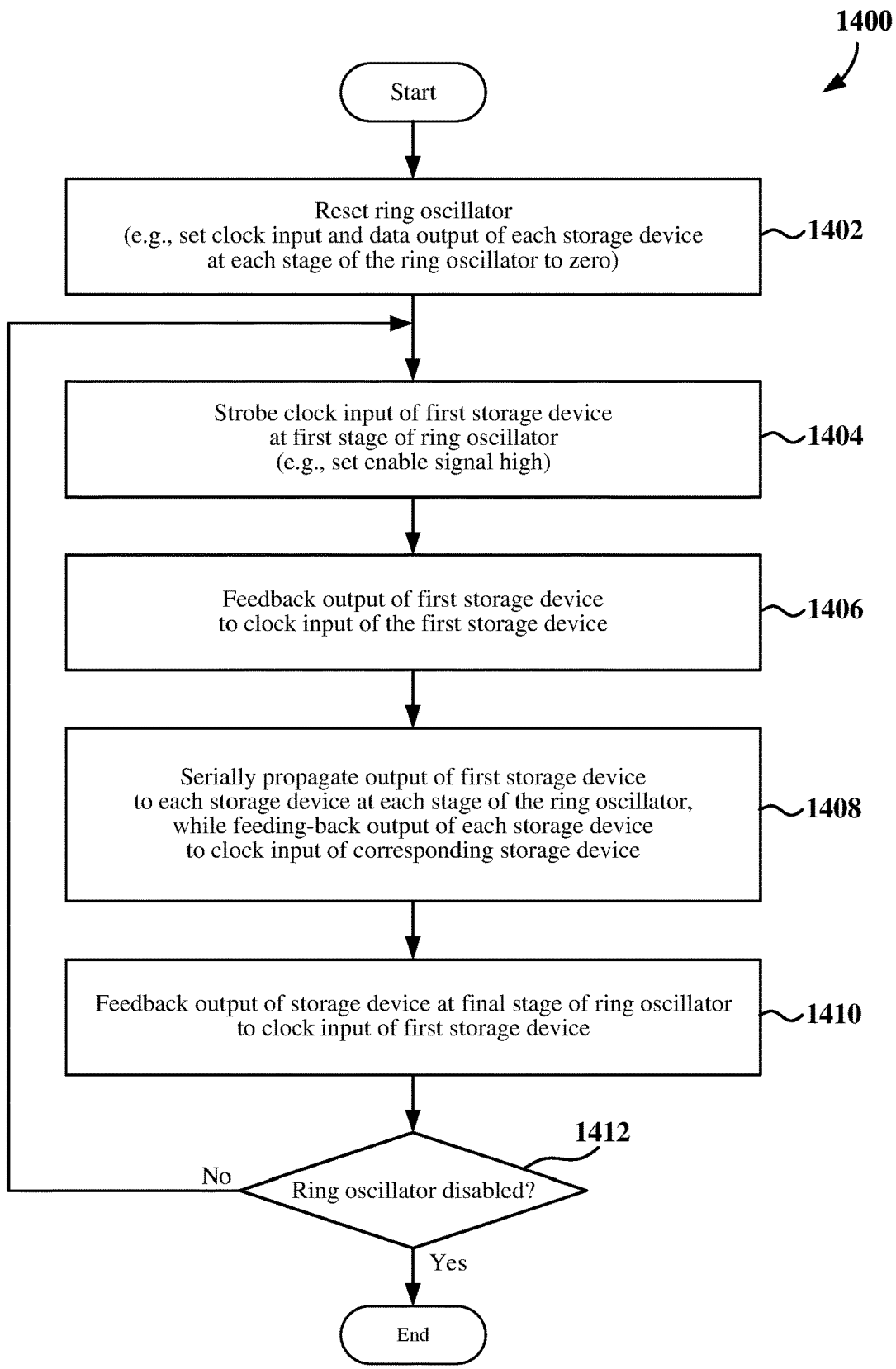
FIG. 14 illustrates an example ring oscillator method in accordance with certain aspects of the disclosure.

FIG. 14 illustrates an example ring oscillator method 1400 in accordance with certain aspects of the disclosure. As described below, some or all illustrated features may be omitted in a particular implementation within the scope of the present disclosure, and some illustrated features may not be required for implementation of all examples. In some examples, the method 1400 may be carried out by the apparatus 200 illustrated in FIG. 2, the RO 400 illustrated in FIG. 5, the multi-stage RO 1300 illustrated in FIG. 13, an SoC, or a processing system. In some examples, the method 1400 may be carried out by any suitable apparatus or means for carrying out the functions or algorithm described below.

At block 1402, an apparatus resets a ring oscillator. In some examples (e.g., as discussed above in conjunction with FIG. 4), the apparatus may set the clock input and data output of each storage device at each stage of the ring oscillator to zero (e.g., a "0" logic state). In other examples (e.g., as discussed above for the alternative implementation), the apparatus may set the clock input and data output of each storage device at each stage of the ring oscillator to one (e.g., a "1" logic state). In some examples, the reset circuit 452 and/or the pulse generator circuit 450 of FIG. 4 may provide a means to reset a ring oscillator.

At block 1404, the apparatus strobes a clock input of a first storage device at first stage of the ring oscillator. In some examples, the enable circuit 468 of FIG. 4 may provide a means to strobe a clock input of a first storage device at first stage of the ring oscillator.

At block 1406, the apparatus feeds back the output of the first storage device to the clock input of the first storage device. In some examples, the first multiplexer 454 and the first XOR 426 of FIG. 4 may provide a means to feedback the output of the first storage device to clock input of the first storage device. In some examples, the first feedback path for clock 1318 of FIG. 13 may provide a means to feedback the output of the first storage device to clock input of the first storage device.

At block 1408, the apparatus serially propagates the output of the first storage device to each storage device at each stage of the ring oscillator, while feeding-back the output of each storage device to the clock input of the corresponding storage device. In some examples, the circuitry associated with the second FF 404 and the third FF 406 of FIG. 4 may provide a means to serially propagate the output of the first storage device to each storage device at each stage of the ring oscillator, while feeding-back the output of each storage device to the clock input of the corresponding storage device. In some examples, the intervening stages 1306 and the final stage 1304 of FIG. 13 may provide a means to serially propagate the output of the first storage device to each storage device at each stage of the ring oscillator, while feeding-back the output of each storage device to the clock input of the corresponding storage device.

At block 1410, the apparatus feeds back the output of the storage device at the final stage of the ring oscillator to the clock input of the first storage device. In some examples, the fourth XOR 440 and the first XOR 426 of FIG. 4 may provide a means to feedback the output of the storage device at the final stage of the ring oscillator to the clock input of the first storage device. In some examples, the feedback path for clock 1332 of FIG. 13 may provide a means to feedback the output of the storage device at the final stage of the ring oscillator to the clock input of the first storage device.

At block 1412, the operations of blocks 1404 though 1410 are repeated until the ring oscillator is disabled. In some examples, the enable circuit 468 of FIG. 4 may provide a means to disable the ring oscillator.

The following provides an overview of various aspects of the present disclosure.

Aspect 1: An apparatus, comprising: a first edge-triggered storage device comprising a first clock input, a first data input, and a first data output; a first feedback path from the first data output to the first clock input; a second edge-triggered storage device comprising a second clock input, a second data input, and a second data output, the second clock input being coupled to the first data output; a second feedback path from the second data output to the second clock input; and a third feedback path from the second data output to the first clock input.

Aspect 2: The apparatus of aspect 1, wherein: first signaling via the first feedback path repeatedly sets the first clock input to a low state; and second signaling via the second feedback path repeatedly sets the second clock input to the low state.

Aspect 3: The apparatus of any of aspects 1 through 2, wherein third signaling via the third feedback path repeatedly sets the first clock input to a high state.

Aspect 4: The apparatus of any of aspects 1 through 3, wherein: the first edge-triggered storage device comprises a first flip flop circuit; and the second edge-triggered storage device comprises a second flip flop circuit.

Aspect 5: The apparatus of any of aspects 1 through 3, wherein: the first edge-triggered storage device comprises a first data register circuit; and the second edge-triggered storage device comprises a second data register circuit.

Aspect 6: The apparatus of any of aspects 1 through 5, wherein: the first edge-triggered storage device is configured as a first stage of a ring oscillator; and the second edge-triggered storage device is configured as a final stage of the ring oscillator.

Aspect 7: The apparatus of aspect 6, wherein an oscillation frequency of the ring oscillator is based at least on: first clock-to-output delays associated with first rising edges and first falling edges output from the first data output of the first edge-triggered storage device; and second clock-to-output delays associated with second rising edges and second falling edges output from the second data output of the second edge-triggered storage device.

Aspect 8: The apparatus of aspect 7, further comprising: a voltage controller configured to scale a power supply voltage based at least in part on the oscillation frequency of the ring oscillator.

Aspect 9: The apparatus of any of aspects 1 through 8, wherein: the first edge-triggered storage device is configured as a first stage of a ring oscillator; and the second edge-triggered storage device is configured as a second stage of the ring oscillator.

Aspect 10: The apparatus of any of aspects 1 through 9, further comprising: at least a third edge-triggered storage device coupling the first data output to the second clock input.

Aspect 11: The apparatus of any of aspects 1 through 10, further comprising: a reset circuit that sets the first data output and the second data output to a low state.

Aspect 12: An apparatus, comprising: first storage means comprising a first clock input and a first data output; first feedback means that feedbacks a first signal from the first data output to the first clock input; second storage means comprising a second clock input and a second data output, the second clock input being coupled to the first data output; second feedback means that feedbacks a second signal from the second data output to the second clock input; and third feedback means that feedbacks a third signal from the second data output to the first clock input.

Aspect 13: A ring oscillator, comprising: a first edge-triggered storage device comprising a first clock input, a first data input, and a first data output; a first logic circuit comprising a first input, a second input, and a first output, the first input being coupled to the first data output of the first edge-triggered storage device, the second input being coupled to a reset circuit, the first output being coupled to the first data input of the first edge-triggered storage device; a first multiplexer comprising a first multiplexer input, a second multiplexer input, a control input, and a multiplexer output, the first multiplexer input being coupled to the first data output of the first edge-triggered storage device, the control input being coupled to the reset circuit; and a second logic circuit comprising a third input, a fourth input, and a second output, the third input being coupled to the multiplexer output, the second output being coupled to the first clock input of the first edge-triggered storage device.

Aspect 14: The apparatus of aspect 13, wherein: the first logic circuit comprises a negative OR (NOR) circuit or a negative AND (NAND) circuit; and the second logic circuit comprises an exclusive OR (XOR) circuit.

Aspect 15: The apparatus of any of aspects 13 through 14, wherein the first edge-triggered storage device comprises a flip flop circuit or a data register circuit.

Aspect 16: The apparatus of any of aspects 13 through 15, wherein the second multiplexer input is coupled to a pulse generator circuit.

Aspect 17: The apparatus of any of aspects 13 through 16, further comprising: a third logic circuit comprising a fifth input, a sixth input, and a third output, the fifth input being coupled to an enable circuit, the third output being coupled to the fourth input of the second logic circuit.

Aspect 18: The apparatus of aspect 17, wherein the third logic circuit comprises an exclusive OR (XOR) circuit.

Aspect 19: The apparatus of any of aspects 17 through 18, further comprising: a second edge-triggered storage device comprising a second clock input, and a second data output, the second data output being coupled to the sixth input of the third logic circuit; and a fourth logic circuit comprising a seventh input, an eighth input, and a fourth output, the seventh input being coupled to the first data output of the first edge-triggered storage device, the eighth input being coupled to the second data output of the second edge-triggered storage device, the fourth output being coupled to the second clock input of the second edge-triggered storage device.

Aspect 20: The apparatus of any of aspects 1 through 19, further comprising: at least a third edge-triggered storage device coupling the first data output of the first edge-triggered storage device to the seventh input of the fourth logic circuit.

Within the present disclosure, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may include, for example, ascertaining, resolving, selecting, choosing, establishing, calculating, computing, processing, deriving, investigating, looking up (e.g., looking up in a table, a database or another data structure), and the like. Also, "determining" may include receiving (e.g., receiving information), accessing (e.g., accessing data in a memory), and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus, comprising:
   a first edge-triggered storage device comprising a first clock input, a first data input, and a first data output;
   a second edge-triggered storage device comprising a second clock input, a second data input, and a second data output, the second clock input being coupled to the first data output;
   a first feedback path from the first data output to the first clock input, wherein the first feedback path does not pass through the second edge-triggered storage device;
   a second feedback path from the second data output to the second clock input; and
   a third feedback path from the second data output to the first clock input;
   at least a third edge-triggered storage device coupling the first data output to the second clock input.

2. The apparatus of claim 1, wherein:
   first signaling via the first feedback path repeatedly sets the first clock input to a low state; and
   second signaling via the second feedback path repeatedly sets the second clock input to the low state.

3. The apparatus of claim 2, wherein third signaling via the third feedback path repeatedly sets the first clock input to a high state.

4. The apparatus of claim 1, wherein:
   the first edge-triggered storage device comprises a first flip flop circuit; and
   the second edge-triggered storage device comprises a second flip flop circuit.

5. The apparatus of claim 1, wherein:
   the first edge-triggered storage device comprises a first data register circuit; and
   the second edge-triggered storage device comprises a second data register circuit.

6. The apparatus of claim 1, wherein:
   the first edge-triggered storage device is configured as a first stage of a ring oscillator; and
   the second edge-triggered storage device is configured as a second stage of the ring oscillator.

7. The apparatus of claim 1, further comprising a reset circuit configured to:
   set the first data output and the second data output to a low state; and
   couple a pulse signal to the first clock input and the second clock input.

8. An apparatus, comprising:
   a first edge-triggered storage device comprising a first clock input, a first data input, and a first data output;
   a second edge-triggered storage device comprising a second clock input, a second data input, and a second data output, the second clock input being coupled to the first data output;
   a first feedback path from the first data output to the first clock input, wherein the first feedback path does not pass through the second edge-triggered storage device;
   a second feedback path from the second data output to the second clock input; and
   a third feedback path from the second data output to the first clock input, wherein:
   the first edge-triggered storage device is configured as a first stage of a ring oscillator; and
   the second edge-triggered storage device is configured as a final stage of the ring oscillator.

9. The apparatus of claim 8, wherein an oscillation frequency of the ring oscillator is based at least on:
   first clock-to-output delays associated with first rising edges and first falling edges output from the first data output of the first edge-triggered storage device; and second clock-to-output delays associated with second rising edges and second falling edges output from the second data output of the second edge-triggered storage device.

10. The apparatus of claim 9, further comprising:
a voltage controller configured to scale a power supply voltage based at least in part on the oscillation frequency of the ring oscillator.

11. An apparatus, comprising:
first storage means comprising a first clock input and a first data output;
first feedback means that feedbacks a first signal from the first data output to the first clock input;
second storage means comprising a second clock input and a second data output, the second clock input being coupled to the first data output;
second feedback means that feedbacks a second signal from the second data output to the second clock input; and
third feedback means that feedbacks a third signal from the second data output to the first clock input.

12. A ring oscillator, comprising:
a first edge-triggered storage device comprising a first clock input, a first data input, and a first data output;
a first logic circuit comprising a first input, a second input, and a first output, the first input being coupled to the first data output of the first edge-triggered storage device, the second input being coupled to a reset circuit, the first output being coupled to the first data input of the first edge-triggered storage device;
a first multiplexer comprising a first multiplexer input, a second multiplexer input, a control input, and a multiplexer output, the first multiplexer input being coupled to the first data output of the first edge-triggered storage device, the control input being coupled to the reset circuit; and
a second logic circuit comprising a third input, a fourth input, and a second output, the third input being coupled to the multiplexer output, the second output being coupled to the first clock input of the first edge-triggered storage device.

13. The ring oscillator of claim 12, wherein:
the first logic circuit comprises a negative OR (NOR) circuit or a negative AND (NAND) circuit; and
the second logic circuit comprises an exclusive OR (XOR) circuit.

14. The ring oscillator of claim 12, wherein the first edge-triggered storage device comprises a flip flop circuit or a data register circuit.

15. The ring oscillator of claim 12, wherein the second multiplexer input is coupled to a pulse generator circuit.

16. The ring oscillator of claim 12, further comprising:
a third logic circuit comprising a fifth input, a sixth input, and a third output, the fifth input being coupled to an enable circuit, the third output being coupled to the fourth input of the second logic circuit.

17. The ring oscillator of claim 16, wherein the third logic circuit comprises an exclusive OR (XOR) circuit.

18. The ring oscillator of claim 16, further comprising:
a second edge-triggered storage device comprising a second clock input, and a second data output, the second data output being coupled to the sixth input of the third logic circuit; and
a fourth logic circuit comprising a seventh input, an eighth input, and a fourth output, the seventh input being coupled to the first data output of the first edge-triggered storage device, the eighth input being coupled to the second data output of the second edge-triggered storage device, the fourth output being coupled to the second clock input of the second edge-triggered storage device.

19. The ring oscillator of claim 18, further comprising:
at least a third edge-triggered storage device coupling the first data output of the first edge-triggered storage device to the seventh input of the fourth logic circuit.

* * * * *